United States Patent [19]

Hirose et al.

[11] Patent Number: 4,955,471
[45] Date of Patent: Sep. 11, 1990

[54] PACKAGING STRUCTURE FOR A RING-SHAPED PRODUCT

[75] Inventors: Kimimoto Hirose; Tsutomu Hiramoto, both of Tamaho, Japan

[73] Assignee: Konica Corporation, Tokyo, Japan

[21] Appl. No.: 238,031

[22] Filed: Aug. 29, 1988

[30] Foreign Application Priority Data

Sep. 5, 1987 [JP] Japan ............................ 62-136105[U]
Nov. 17, 1987 [JP] Japan ............................ 62-175158[U]

[51] Int. Cl.[5] ...................... B65D 85/62; B65D 85/671
[52] U.S. Cl. ..................................... 206/303; 206/394; 206/411; 206/497
[58] Field of Search ............... 206/303, 307, 309, 310, 206/444, 445, 446, 497, 391, 394, 411

[56] References Cited

U.S. PATENT DOCUMENTS

| | | | |
|---|---|---|---|
| 4,022,320 | 5/1977 | Hadley | 206/310 |
| 4,282,973 | 8/1981 | Binkowski | 206/444 |
| 4,434,891 | 3/1984 | Skinner et al. | 206/444 |
| 4,457,429 | 7/1984 | Huber et al. | 206/444 |
| 4,491,222 | 1/1985 | Gaccetta et al. | 206/497 |
| 4,502,598 | 3/1985 | Wartenbergh | 206/444 |
| 4,516,678 | 5/1985 | Fotiadis et al. | 206/444 |
| 4,577,756 | 3/1986 | Hennessy et al. | 206/303 |

FOREIGN PATENT DOCUMENTS

| | | | |
|---|---|---|---|
| 0208677 | 12/1982 | Japan | 206/444 |
| 0052931 | 8/1933 | Norway | 206/310 |
| 1310298 | 5/1987 | U.S.S.R. | 206/444 |
| 1364549 | 1/1988 | U.S.S.R. | 206/303 |

*Primary Examiner*—Jimmy G. Foster
*Attorney, Agent, or Firm*—Jordan B. Bierman; Bierman and Muserlian

[57] ABSTRACT

Disclosed is an apparatus for packaging a plurality of disk-shaped products, such as a roll of magnetic tape, wherein a magnetic tape is rolled up around a hub. In the apparatus, the disk-shaped products are piled up so that the hubs are aligned along the axial direction. The apparatus has a center core passing through the hubs, at least one pare of pressing plates being positioned at both ends of the piled disk-shaped products so that disk-shaped products are pressed in the axial direction between the pressing plates, and heat shrinkable sheet for fixing a positional relation between the center core and the pressing plates.

10 Claims, 32 Drawing Sheets

FIG.5(b)
FIG.5(a)
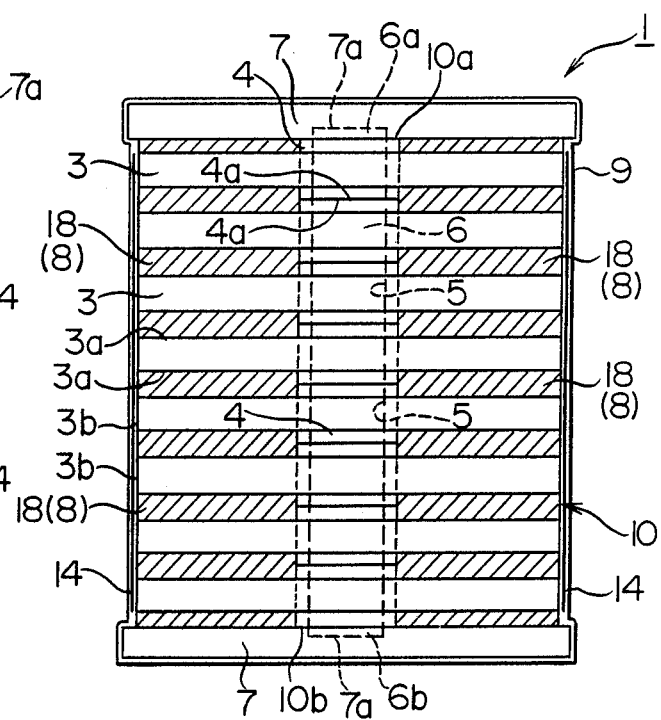
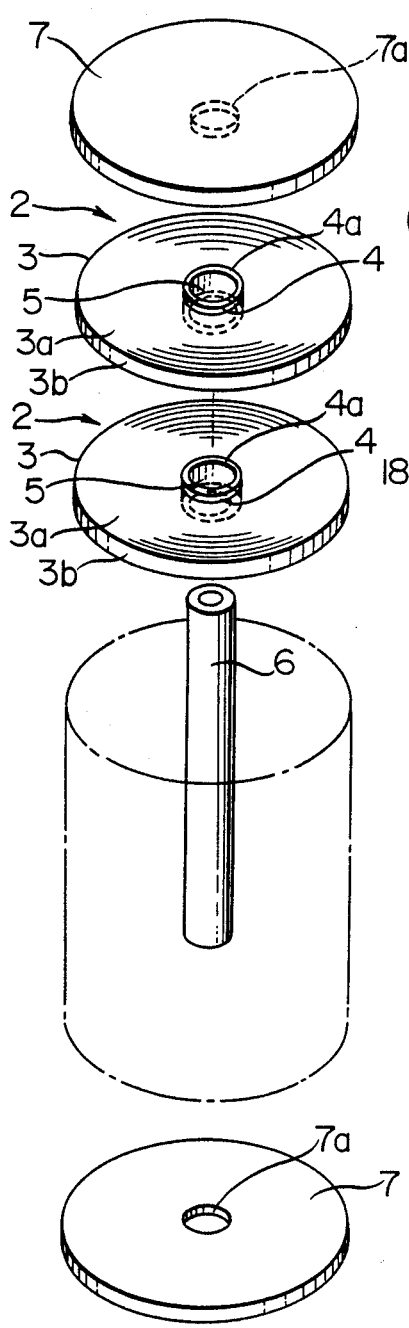
FIG.5(c)
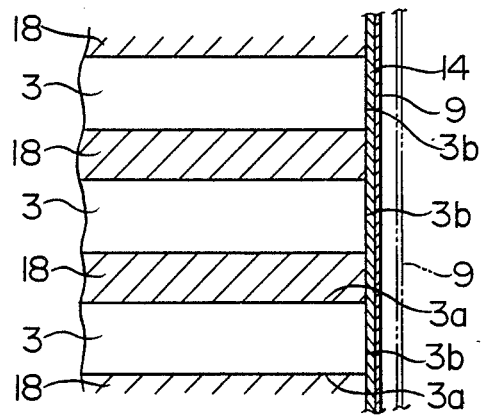

PACKAGING STRUCTURE FOR A RING-SHAPED PRODUCT

BACKGROUND OF THE INVENTION

The invention relates to a packaging structure for a ring-shaped product or disk-shaped product (such as a roll of magnetic tape called "pancake").

A magnetic tape intended to be loaded in a tape cassette or the like is, in the manufacturing process, wound around a hub with a specific tension, and is formed into a pancake of a specific diameter for storage or transportation.

FIGS. 46 and 47 respectively illustrate a conventional transportation tray 128 for a pancake.

The tray 128 has a substantially octagonal-shaped tray proper 122 made of foamed polystyrene; a pancake housing area 123 formed on the tray proper 122; and ring shaped cushions 125 and 126 made of foamed polyethylene and are disposed (with adhesive) on both upper and lower faces of the tray. The tray 122 has in its center a disc shaped projection 127, thereby as shown in FIG. 47, centering around the projection 127 and on the cushion 125 is loaded a pancake 2 (a magnetic tape 3 wound around a hub 4).

To facilitate transportation or storage, a plurality of trays 128 are vertically stacked as shown in FIG. 47 (for clarity, this figure illustrates only two stages of trays), wherein a pancake 2 is held sandwiched between the cushions 126 and 125 of the upper and lower trays. Once satisfactorily stacked, whole the stacked trays are bound together with a binding band 129, and are wrapped with a heat shrinkable film 130 by heat shrinking process, thus package is complete.

Since such a pancake packaging structure requires each pancake to be packed in each transportation tray, thus necessitating a multiplicity of trays, incurring a higher cost for transportation and the like, and, manufacturing and maintenance costs for the trays are higher; procedures for loading and unloading pancakes for transportation and storage are cumbersome and time-consuming.

SUMMARY OF THE INVENTION

The object of the invention is to provide a packaging structure for ring shaped articles, wherein the characteristics of the structure are as follows: a simple structure that allows cost reduction; easy handling in transportation, storage and the like, allowing great cost reduction in transportation and storage; light weight and good transportability; good resistance to heat-deformation, and strong package.

To achieve the above-mentioned object, the packaging structure, which the present invention provides, for ring shaped articles comprises core members that penetrate through the central hole in an array of ring shaped articles arranged along a specific direction with the main faces of the plurality of articles being adjacent with each other; stopper members that combinedly press both end faces of the array of ring shaped articles toward their counterparts along the above-mentioned specific direction; and securing means that positively maintains the relative position among the core member and the stopper members.

Alternatively, cushion members are disposed between the main faces of the plurality of ring shaped members, wherein at least the circumferential face of the array of ring shaped articles is covered with a protective sheet, whereby a shrinkable packaging film may press together the above-mentioned stopper members and the protective sheet, and may cover the overall surface of the protective sheet.

Additionally, the packaging structure of the invention can have a first pair of stopper members that press both end faces of the array of ring shaped articles toward their counterparts along the above-mentioned specific direction (axial direction); securing means that positively maintains the relative position among the core member and the stopper members; a pair of second stopper members that excels in shape-stability and that press, from the above-mentioned both end faces, the first pair of stopper members toward their counterparts along the above-mentioned specific direction; and securing means that joins together the second pair of stopper members and that are capable of positively maintaining the relative position between the second pair of stopper members.

According to the invention, the securing means for maintaining the relative position among the core member and the stopper members can comprise:

(a) a coupling means that connects between the stopper members on both end faces; and
(b) a packaging film that maintains the coupling status above and that covers the overall surface.

In this case, a possible method for forming the above-mentioned packaging structure is as follows: core members penetrate through the central hole in an array of ring shaped articles arranged along a specific direction with the main faces of the plurality of articles being adjacent with each other; next, a stopper member is installed to each end of the core member; then stopper members are joined together so that they do not depart from the core member; and the overall surface is wrapped with a packaging film.

The possible configurations of the stopper members according to the invention are as follows:

(1) each projection integrally formed on the middle portion of each stopper member engages with the hub of each ring shaped article;
2) instead of the projection mentioned in (1) above on a stopper member, there is a hollow core between the middle portion on each stopper member and a core member of each ring shaped article; and
(3) stopper members are constituted so that when these members are secured with securing means and they are deformed inward, the deformed areas of the stopper members do not come into contact with the ring shaped articles.

If a stopper member is provided with a recess, the dimensional relation between the stopper member and a core member preferably satisfies the expression;

$$A < L < A + 2B$$

wherein L represents the length of the core member; A, the total length of the array of ring shaped articles; and B, the depth of the recess on the stopper member.

A material for forming a stopper member useful in embodying the invention is not specifically limited as far as it has sufficient strength. Incidentally, foamed polystyrene often used as a packaging material has been found to have the following problem. That is, in a heat shrinking process or the like, a temperature of 110° to 180° C. is usually exerted. Foamed polystyrene expands at 130° to 160° C. as a result of tertiary foaming, causing an already obtained form (in the secondary forming) to be deformed or deteriorated. This is because a form made of foamed polystyrene is prepared by subjecting foamed beads (already undergone primary foaming) of approx. 2 mm dia. to secondary foaming, and the beads are formed into an intended shape; and that individual foams further generates minor foams by heat in the course of the shrinking process. In order to solve this question in the heat shrinking process is preferable that at least some parts of materials consist of foamed polypropylene or foamed polyethylene.

BRIEF DESCRIPTION OF THE DRAWINGS

FIGS. 1 through 45 are perspective side and cross-sectional views of preferred embodiments of the invention.

DETAILED DESCRIPTION OF THE INVENTION

The preferred embodiments of the invention are hereunder described.

Figure 1A:
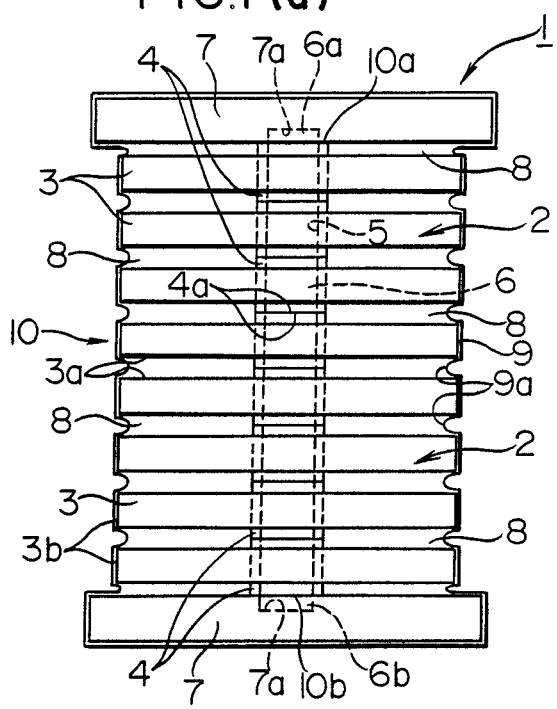
Figure 1B:
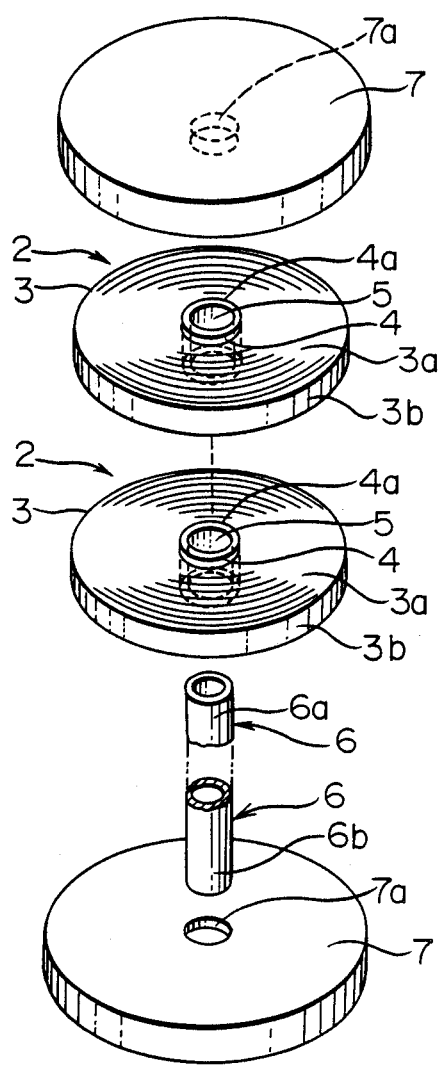
Figure 1C:
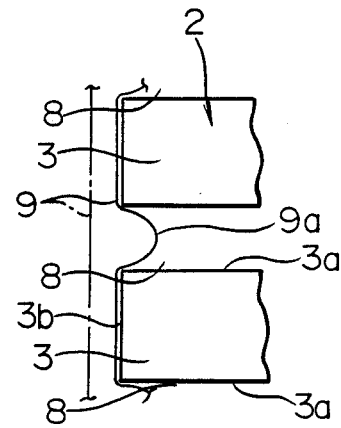

FIG. 1 illustrates the first embodiment of the invention, wherein FIG. 1(a) illustrates a front view of a pancake packaging structure 1 (hereinafter arbitrarily called the "packaging structure); FIG. 1(b) is a partially exploded perspective view; and FIG. 1(c) is a partially enlarged view of FIG. 1(a).

In FIG. 1(a), a plurality of pancakes 2 are disposed vertically and form an array of pancakes 10 as the end faces 4a of the hubs 4 are adjacent with each other, wherein the respective circumferential faces 3b of the magnetic tapes 3 are vertically (relative to the drawing) aligned with each other, whereby between neighboring pancakes 2, the faces 3a of rolled magnetic tapes 3 face with each other via spaces 8.

Through a central hole 5 in each pancake 2 or the array of pancakes 10 penetrate a column shaped or hollow cylindrical core member 6 that positively maintain the lateral position of each pancake 2. Both outermost ends 6a and 6b of core members 6 protrude, from the through hole 5, on the array of pancakes 10. Both ends 6a and 6b are engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10b thereof to exert inward pressure.

The external surface of such a packaging structure is further wrapped with a film 9 known as a shrink film, reinforcing the packaging structure. As shown in FIG. 1(c), when a shrink film 9 covers the external surface of the structure, and takes a profile as shown by dashed lines, there is a marginal space between the film and the structure. Then the shrink film is subjected to a heat shrink process, thereby the film shrinks to take a profile shown by solid lines, pressing inward the circumferential faces 3b of the magnetic tapes, and further pressing inward the stopper members 7. This arrangement further reinforces the packaging, and protects the contents against moisture or the like. Additionally, certain portions on the film 9 slightly enter the spaces 8 and form ribs 9a, thereby the circumferential faces of the magnetic tapes are securely held by the ribs, and slack on the circumferential faces is eliminated; the magnetic tapes 3 are more positively positioned, the circumferential faces are protected against physical impact or the like, and the damage to the magnetic tapes is prevented. Furthermore, the pancakes (independent rolled magnetic tapes) 2 are not directly in contact with each other, and the tapes are free from damage possibly caused by mutual friction.

The above-mentioned pancake packaging structure is a simple structure and simplifies the manufacturing processes of components and parts including stoppers, enabling cost reduction. Other advantages are simpler packaging operation, easy handling for transportation, storage and the like, and lower costs in transportation and storage; the simple structure means light weight, and better transportability.

The stopper member 7 can be made of foamed styrol or the like. The core members 6 can be made of vinyl chloride resin, paper or the like. The shrink film 9 can be made of various resins such as polypropylene, and polyethylene.

Figure 2A:
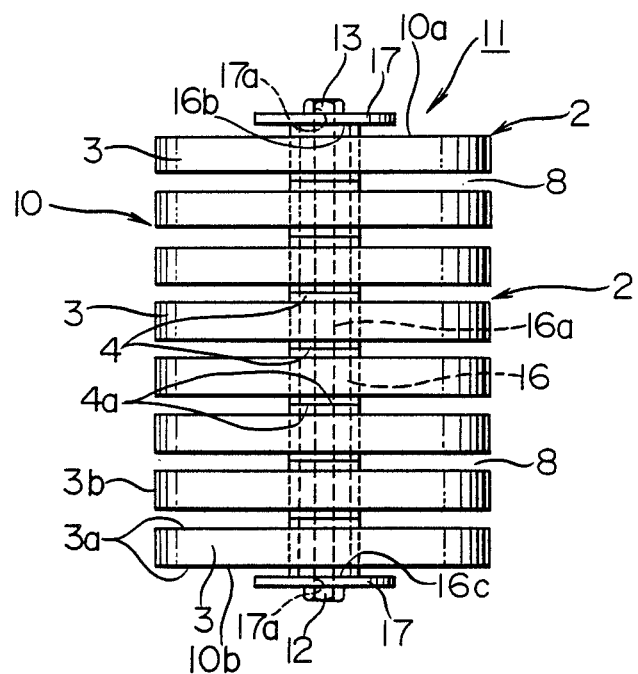
Figure 2B:
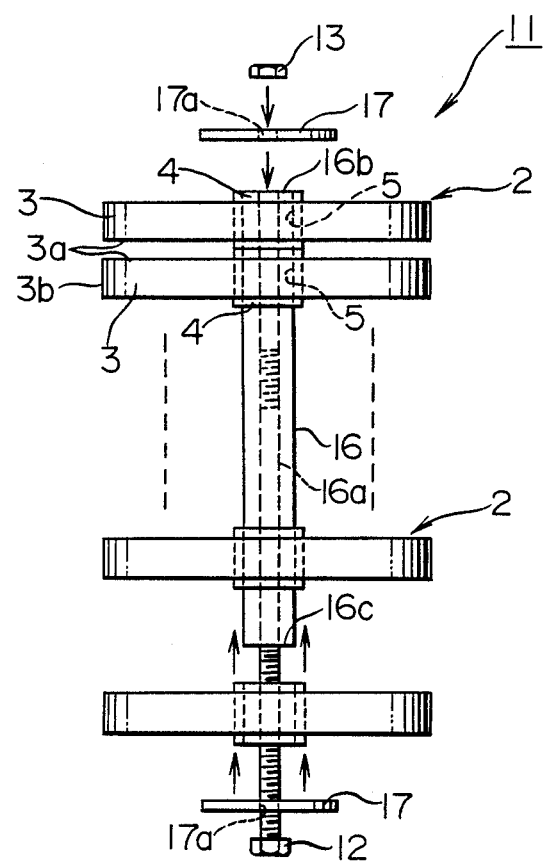

FIG. 2 illustrates the second embodiment of the invention. FIG. 2(a) is a front view of a packaging structure 11, and FIG. 2(b) is a front exploded view of the packaging structure 11.

The constitution of an array of pancakes 10 is the same as the previous embodiment.

A tube 16 penetrates through a central hole 5 of the array of pancakes 10, and an end face 16b (16c) of the tube 16 is on a plane common with that of end face 10a (10b) of the array of pancakes 10. The end faces 16b, 10a and the end faces 16c, 10b are held together with a ring shaped stopper member (plate) 17 located to the outside, thereby through a central hole 17a of the stopper member 17 and a central hole 16a of the tube 16 penetrates a bolt 12 that engages with a nut 13. According to this arrangement, the stopper member 17 is subjected to an inward force by the combination of the bolt 12 and the nut 13, thereby both end faces 10a and 10b of the array of pancakes 10 are forced by the stopper members 17 toward the respective counterparts, thus a strong and stable package is complete.

This embodiment too is capable of the effect of the invention mentioned previously.

Figure 3:
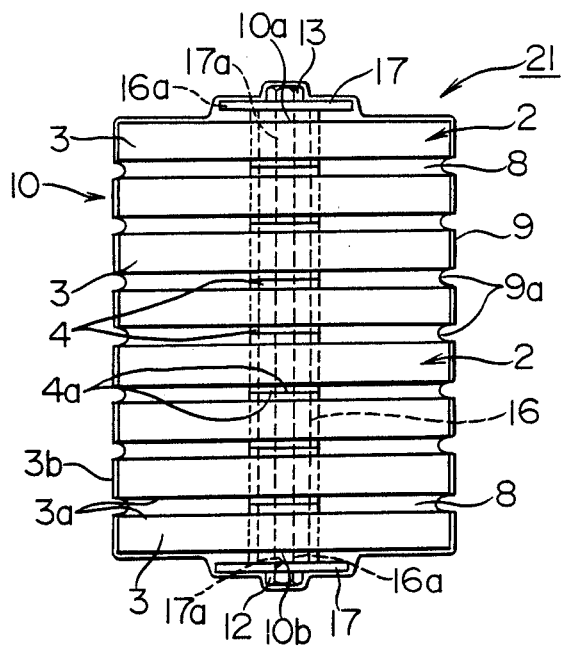

FIG. 3 is a front view illustrating the third embodiment of the invention.

A packaging structure 21 according to this embodiment comprises a packaging structure 11 whose external surface is wrapped with a shrink film 9 (refer to FIG. 1). This arrangement ensures much stabler packaging.

Figure 4:
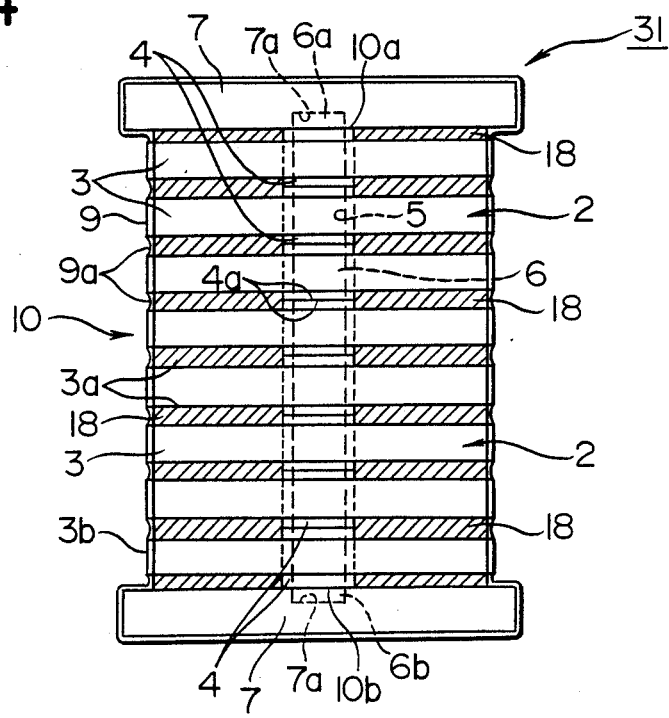

FIG. 4 is a front view illustrating the fourth embodiment of the invention.

A packaging structure 31 resembles the packaging structure 1 illustrated in FIG. 1, wherein an array of pancakes 10 is characterized in that each space 8 formed between adjacent magnetic tapes 3 of respective pancakes 2 houses a ring shaped cushion 18.

The ring shaped cushion is made of foamed plastic such as foamed polyethylene, and a preferred cushion has an outer diameter identical with or marginally larger than that of a pancake. This arrangement, in conjunction with the shrink film 9, eliminates possible slack on the external faces of the magnetic tapes 3, further positively defines the positions of the magnetic tapes, and protects the faces of the magnetic tapes against impact or the like.

The invention has been described as above. However, the possible scope of the preferred embodiments of the invention is not limited to those described above, and various modifications can be incorporated based on the technical concept of the invention.

For example, in FIGS. 1 and 4, means for maintaining the relative position between a stopper member 7 and a core member 6 can be mutual engagement or adhesion of both members; otherwise, both stopper members 7 are provided with central holes through which core members penetrate, and both ends of the end core member are provided with male-threading and are secured with nuts, or, as shown in FIG. 2, a bolt-nut combination can be used for this purpose. Alternatively, one of stopper members 7 may be provided with a central hole through which a core member penetrates. These modifications are applicable to the packaging structures in FIGS. 2 and 3, wherein, for example, a stopper member 17 may penetrate through a tube member 16.

A ring shaped cushion 18 (refer to FIG. 4) may be incorporated into a packaging structure either in FIG. 2 or 3.

A stopper member and core member can take various dimensions, configurations and the like. A stopper member is not essentially a plate type member. A small recess that contacts and presses each side face 10a (10b) on an array of pancakes may be formed on each stopper member so as to prevent positional deviation of the array and the stopper members. The core members 6 either in FIG. 1 or 4 are not necessarily hollow cylinder type and can be solid cylinder type. The cross-section of the member can be triangular, quadrangular, stellar, starfish-shaped or the like. The preferred cross-section is such that a core member can be tightly engaged with the inner surface of a central hole 5 to allow stable positioning and that pancakes 2 do not move. The central hole of an array of pancakes can take various configuration and dimension(s).

The present invention is applicable to packaging for ring shaped articles other than a pancake.

FIG. 5 illustrates the fifth embodiment of the invention, wherein FIG. 5(a) illustrates a front view of a packaging structure 1; FIG. 5(b) is a partially exploded perspective view of the packaging structure 1; and FIG. 5(c) is a partially enlarged view of FIG. 5(a).

In FIG. 5(a), a plurality of pancakes 2 are disposed vertically and form an array of pancakes 10, wherein the respective circumferential faces 3b of magnetic tapes 3 are vertically (relative to the drawing) aligned with each other, whereby in each pair of pancakes 2, the faces (main faces) 3a of rolled magnetic tapes 3 face with each other via spaces 8.

Through a central hole 5 on each pancake 2 or the array of pancakes 10 penetrate a column shaped or hollow cylindrical core members 6 that positively maintain the lateral position of each pancake 2. Both outermost ends 6a and 6b of core members 6 protrude, from the through hole 5, on the array of pancakes 10. Both ends 6a and 6b are engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10 thereof to exert inward pressure.

With the array of pancakes 10, in each of the spaces 8 formed between the main faces 3a of the pancakes 2 is disposed a ring shaped cushion 18.

The ring shaped cushion is made of foamed plastic such as foamed polyethylene, and a preferred cushion has an outer diameter identical with or marginally larger than that of a pancake. This arrangement, in conjunction with the shrink film 9, eliminates possible slack on the external faces of the magnetic tapes 3, further positively defines the positions of the magnetic tapes, and protects the faces of the magnetic tapes against impact or the like.

The overall external surface of such a packaging structure is further wrapped with a film 9 known as a shrink (packaging) film, reinforcing the packaging structure. As shown in FIG. 5(c), when a shrink film 9 covers the external surface of the structure, and takes a profile as shown by dashed lines, there is a marginal space between the film and the structure. Then the shrink film 9 is subjected to a heating process, thereby the film 9 shrinks to take a profile shown by solid lines, pressing inward the circumferential faces 3b of the magnetic tapes via a cylindrical protective sheet 14 described later, and further pressing inward the stopper members 7. This arrangement further reinforces the packaging, and protects the contents against moisture or the like. Additionally, the film 9, when shrunk, conforms to the profile defined by circumferences of the magnetic tapes 3. Accordingly, in conjunction with the previously mentioned positioning operation of the cushions 18, slack on the circumferences is eliminated; the magnetic tapes 3 are more positively positioned, the circumferential faces are protected against physical impact or the like, and the damage to the magnetic tapes is prevented. Furthermore, the pancakes (independent rolled magnetic tapes) 2 are not directly in contact with each other, and the tapes are free from damage possibly caused by mutual friction.

Additionally, this embodiment is essentially characterized in that the cylindrical protective sheet 14 is disposed as sandwiched between the shrink film 9 and the circumferential face of the array of pancakes 10 in order to package the array of pancakes 10.

A shrink film 9 essentially has a smooth surface, while the circumferential faces 3b of the magnetic tapes 3 is highly smooth. Accordingly, if a shrink film 9 directly wraps the circumference of the array of pancakes 10, the circumferential faces 3b of the magnetic tapes will adhere to the shrink film 9, and results in a problem in opening of the package, or may damage or spoil the merchantability of the magnetic tapes 3.

According to the packaging structure of the present embodiment, the cylindrical protective sheet 14 is disposed as sandwiched between the shrink film 9 and the array of pancakes 10, and this arrangement prevents mutual adhesion of the film and the pancakes; every advantage of a shrink film is positively exhibited, while devoid of the above-mentioned problems. The protective sheet 14 protects the magnetic tapes against outside pressure, thereby the sheet prevents the circumferential faces 3b and the like of the magnetic tapes from being damaged by outside pressure during transportation.

As described above, the pancake packaging structure 1 is a simple structure where a plurality of pancakes are arrayed to form one entity, and, accordingly, the packaging procedure is simple; handling for transportation or storage is simple; and this light weight structure is suitable for transportation. Additionally, according to this embodiment, a manufacturing process of each component such as a stopper member is a simple process, enabling cost reduction; and other than already mentioned advantages, transportation and storage costs are low. Furthermore, combined use of the cushion 18, shrink packaging film 9, and the protective sheet 14 positively ensures quality assurance of the magnetic tapes 3. The protective sheet 14 can be made of paper, for example paper without dust, the plastic film and the like.

Figure 6A:
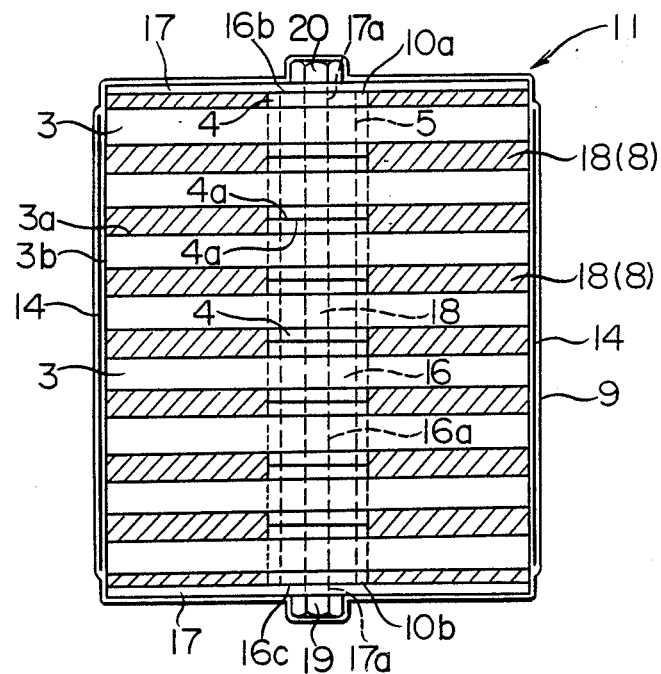
Figure 6B:
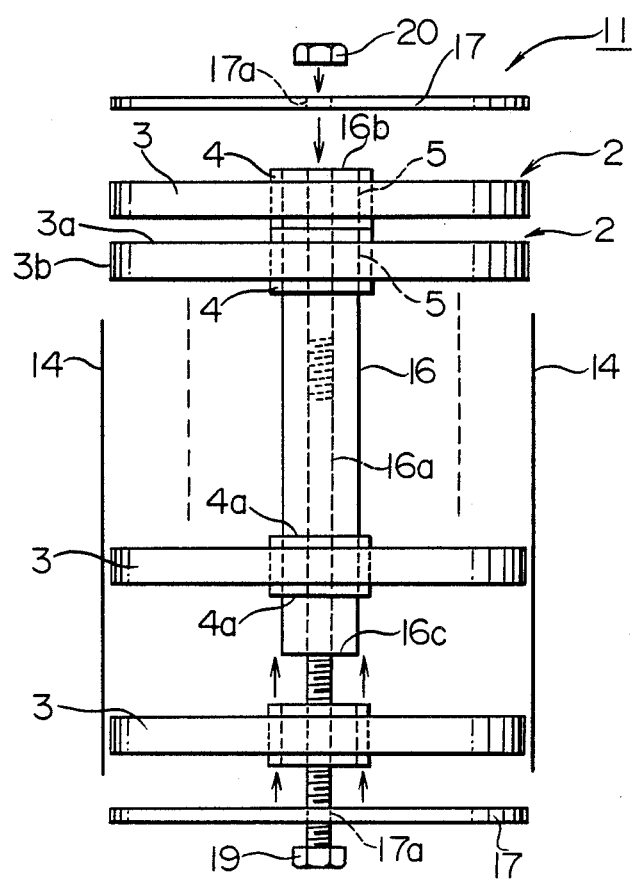

FIG. 6 illustrates the sixth embodiment of the invention. FIG. 6(a) is a front view of a packaging structure 11, and FIG. 6(b) is a front exploded view of the packaging structure 11.

The constitution of an array of pancakes 10 is the same as the previous embodiment.

A tube 16 penetrates through a central hole 5 of the array of pancakes 10, and an end face 16b (16c) of the tube 10 is on a plane common with that of end face 10a (10b) of the array of pancakes 10. The end face 16b (16c) and the end face 10a (10b) are held together with a ring shaped stopper member (plate) 17 located to the outside, thereby through a central hole 17a of the stopper member 17 and a central hole 16a of the tube 16 penetrates a bolt 18 that engages with a nut 19. According to this arrangement, the stopper member 17 is subjected to an inward force by the combination of the bolt 19 and the nut 20. The circumferential face of the array of pancakes 10 is covered with a cylindrical protective sheet 14, and the outer face of this packaging structure is completely wrapped with a shrink packaging film 9, thus a strong and stable package is complete.

This embodiment too is capable of the effect of the invention mentioned previously.

Figure 7A:
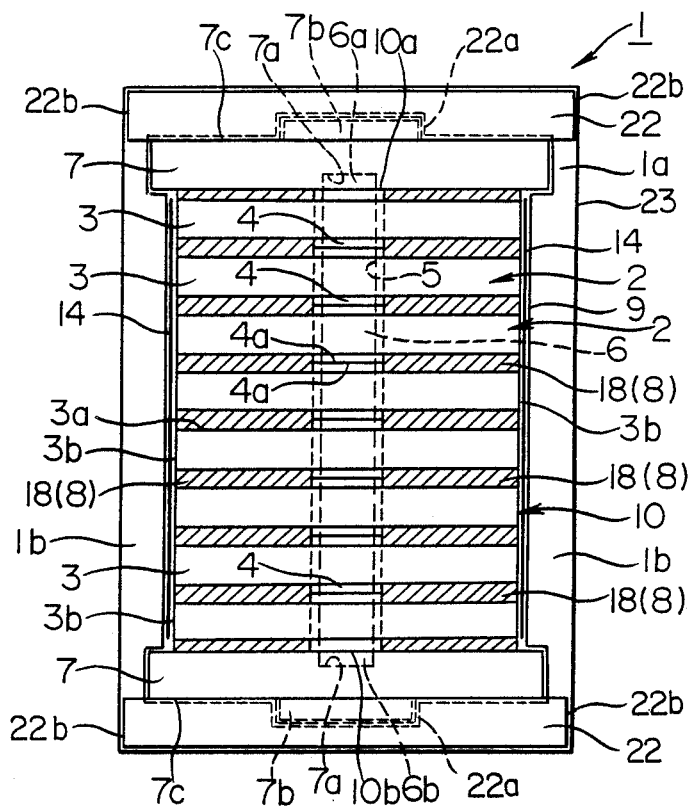

FIG. 7 illustrates the seventh embodiment of the invention, wherein FIG. 7(a) illustrates a front view of a packaging structure 1; FIG. 7(b) is a partially exploded perspective view of the packaging structure 1; FIG. 7(c) is a partially enlarged view of FIG. 7(a); and FIG. 7(d) is a perspective side view.

In FIG. 7(a), a plurality of pancakes 2 are disposed vertically and form an array of pancakes 10, wherein the respective circumferential faces 3b of magnetic tapes 3 are vertically (relative to the drawing) aligned with each other, whereby in each pair of pancakes 2, the faces (main faces) 3a of rolled magnetic tapes 3 face with each other via spaces 8.

Through a central hole 5 on each pancake 2 or the array of pancakes 10 penetrate a column shaped or hollow cylindrical core members 6 that positively maintain the lateral position of each pancake 2. Both outermost ends 6a and 6b of core members 6 protrude, from the through hole 5, on the array of pancakes 10. Both ends 6a and 6b are engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10 thereof to exert inward pressure.

With the array of pancakes 10, in each of the spaces 8 formed between the main faces 3a of the pancakes 2 is disposed a ring shaped cushion 18. The circumferential face of the array of pancakes 10 is covered with a cylindrical protective sheet 14 (in FIG. 7(b), indicated by a dashed line).

Figure 7C:
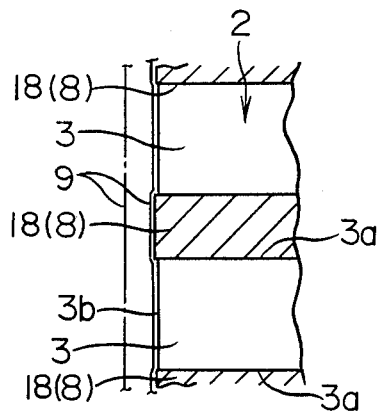
Figure 7B:
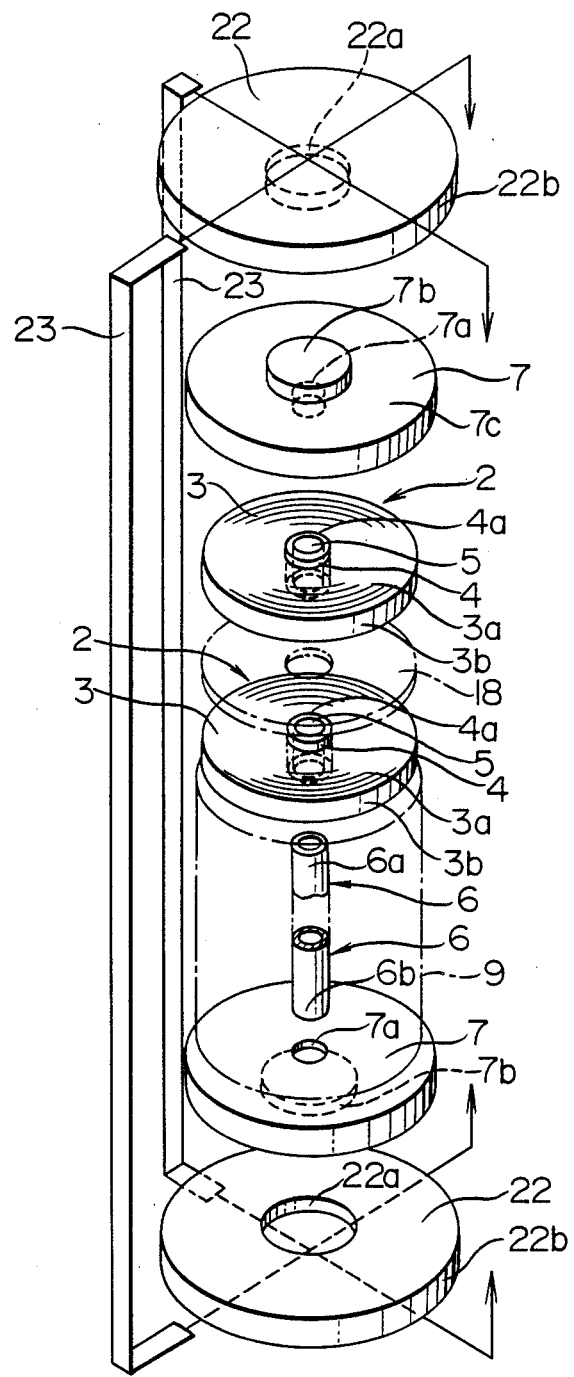
Figure 7D:
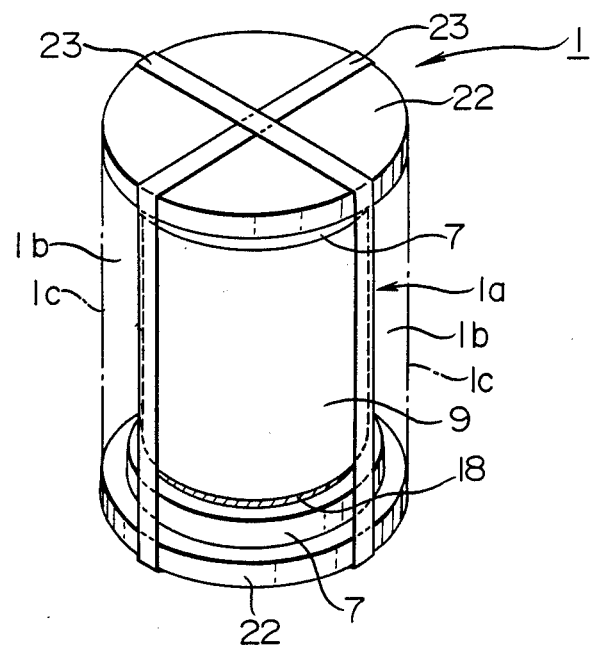

The overall external surface of such a packaging structure is further wrapped with a film 9 known as a shrink (packaging) film, forming a packaging structure 1a(unshown in FIGS. 7(b) and 7(d)).

On a face 7c, that is a face opposite to that presses the array of pancakes 10, of a stopper member is formed a disk shaped protrusion 7b that is engaged, via the shrink film 9, with a hole 22a formed for a (second) stopper member 22, thereby the stopper member 7 and the stopper member 22 is secured together.

Once the above-mentioned packaging procedure is complete, PP bands (band made of polypropylene) spans around both stopper members 22, and when tightened, these bands securely connect both stopper members 22, thereby the positional relation of stopper members is positively maintained, and, as a result, the stopper members 22 force the pair of stopper members 7 toward the array of pancakes 10.

The so-constituted pancake packaging structure 1 has the following operation and effects.

The packaging structure 1 is a simple structure since it is a package of an arrayed and integrated plurality of pancakes, and a packaging procedure is accordingly simplified; handling for transportation or storage is simplified, and its light weight facilitates transportation. An easier manufacturing process of each component such as a stopper member enables cost reduction; this advantage, in conjunction with the above-mentioned advantages, reduces cost for storage.

According to this embodiment, a pair of stopper members 7 are forced toward the array of pancakes 10 with a pair of stopper members 22, and the stopper members 22 are securely connected with each other using PP bands 23, thereby the stopper members 22 are capable of stably maintaining their positional relation. Correspondingly, the stopper members 22 stably hold the inside packaging structure 1a, thereby in conjunction with the shock-absorbing nature of the stopper members 22, the products (pancakes) are more positively packaged; even significantly strong impact seldom damages the pancakes, thereby transportability is further improved. Furthermore, the diameter of the second stopper members 22 is larger than that of the stopper members 7. Accordingly, a space 1b is formed between the shrink packaging film 9 and an imaginary face 1c (indicated with dashed lines in FIG. 7(d)) defined by the circumferential faces 22b of the pair of stopper members 22. Correspondingly, the circumferential face of the inside packaging structure 1a is protected against impact that will occur in the course of stacking or transportation, thereby the magnetic tapes 3 are protected against damage or quality deterioration.

Incorporation of the ring shaped cushions 18 eliminates, as indicated in FIG. 7(c), slack around the circumference of the magnetic tapes, thereby the positioning of the magnetic tapes 3 is further improved, and the circumferential faces of the magnetic tapes are positively protected against impact or the like.

Additionally, incorporation of the shrink packaging film 9 further enhances transportability. As shown in FIG. 7(c), when the shrink film 9 wraps around the packaging structure, the condition of the shrink film is as indicated by dashed lines, thereby there is marginal space between the same film and the packaging structure. Then the shrink film 9 is subjected to a heating process, thereby the film 9 shrinks to take a profile shown by solid lines, pressing inward the circumferential faces 3b of the magnetic tapes via a cylindrical protective sheet 14, and further pressing inward the stopper members 7. This arrangement further reinforces the packaging, and protects the contents against moisture or the like. Additionally, the film 9, when shrunk, conforms to the profile defined by circumferences of the magnetic tapes 3. Accordingly, in conjunction with the previously mentioned positioning operation of the cushions 18, slack on the circumferences is eliminated; the magnetic tapes 3 are more positively positioned, the circumferential faces are protected against physical impact or the like, and the damage to the magnetic tapes is prevented. Furthermore, the pancakes (independent rolled magnetic tapes) 3 are not directly in contact with each other, and the tapes are free from damage possibly caused by mutual friction.

Additionally, the cylindrical protective sheet 14 is disposed as sandwiched between the shrink film 9 and the circumferential face of the array of pancakes 10 in order to package the array of pancakes 10, and this arrangement further enhances good transportability.

A shrink film 9 essentially has a smooth surface, while the circumferential faces 3b of the magnetic tapes 3 is highly smooth. Accordingly, if a shrink film 9 directly wraps the circumference of the array of pancakes 10, the circumferential faces 3b of the magnetic tapes will adhere to the shrink film 9, and results in a problem in opening of the package, or may damage or spoil the merchantability of the magnetic tapes 3.

According to the packaging structure of the present embodiment, the cylindrical protective sheet 14 is disposed as sandwiched between the shrink film 9 and the array of pancakes 10, and this arrangement prevents mutual adhesion of the film and the pancakes; every advantage of a shrink film is positively exhibited, while devoid of the above-mentioned problems. The protective sheet 14 protects the magnetic tapes against outside pressure, thereby the sheet prevents the circumferential faces 3b and the like of the magnetic tapes from being damaged by outside pressure during transportation.

As described above, combined use of the cushions 18, shrink packaging film 9 and protective sheet 14 is significantly effective in maintaining the quality of the magnetic tapes 3.

The stopper members 7 and 27 can be formed with foamed styrol or the like. The core member 6 can be formed using vinyl chloride resin, paper, ABS resin, acrylic resin or the like. The shrink film 9 can be made of various resins such as polypropylene and polyethylene; the protective sheet 14 can be made of paper such as dustless paper, or of plastic film. The ring shaped cushions 18 can be formed with foamed plastic such as foamed polyethylene, and they preferably have a diameter the same as or slightly larger than that of the pancakes 2.

Figure 7E:
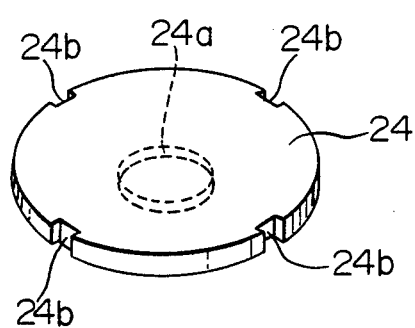

FIG. 7(e) illustrates a second stopper member 24 that is equivalent to the stopper member 22 in FIG. 7.

The stopper member 24 has at each of four positions a notch 24b. When the PP bands 23 span around the package illustrated in FIG. 7(d), the PP bands 23 are engaged with the notches. Accordingly, the PP bands 23, once bound together, will not loosen; bind is enhanced and the package seldom loosens.

FIG. 8 illustrates the eighth embodiment of the invention. FIG. 8(a) is a cross-section of a packaging structure 11, and FIG. 8(b) is a front exploded view of the packaging structure 11; FIG. 8(c) is a perspective side view of a protector 25; and FIG. 8(d) is a perspective side view of the packaging structure 11.

The constitution of an array of pancakes 10 is the same as the previous embodiment.

A tube 16 penetrates through a central hole 5 of the array of pancakes 10, and an end face 16b (16c) of the tube 10 is on a plane common with that of end face 10a (10b) of the array of pancakes 10. The end face 16b (16c) and the end face 10a (10b) are held together with a ring shaped stopper member (plate) 17 located to the outside, thereby through a central hole 17a of the stopper member 17 and a central hole 16a of the tube 16 penetrates a bolt 19 that engages with a nut 20. According to this arrangement, the stopper member 17 is subjected to an inward force by the combination of the bolt 19 and the nut 20. The outer face of this packaging structure is completely wrapped (unshown in FIG. 8 (b)) with a shrink packaging film 9, thus a package 11a is complete.

Figure 8A:
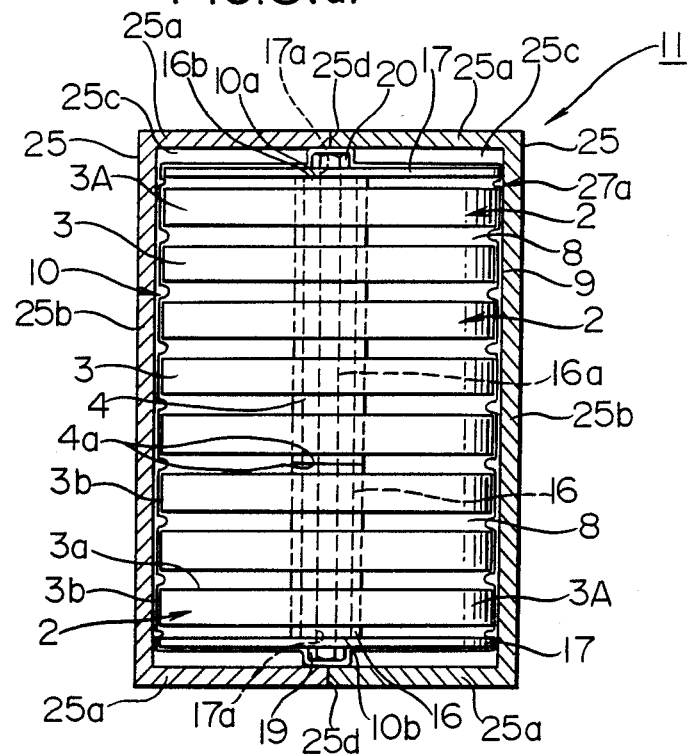
Figure 8C:
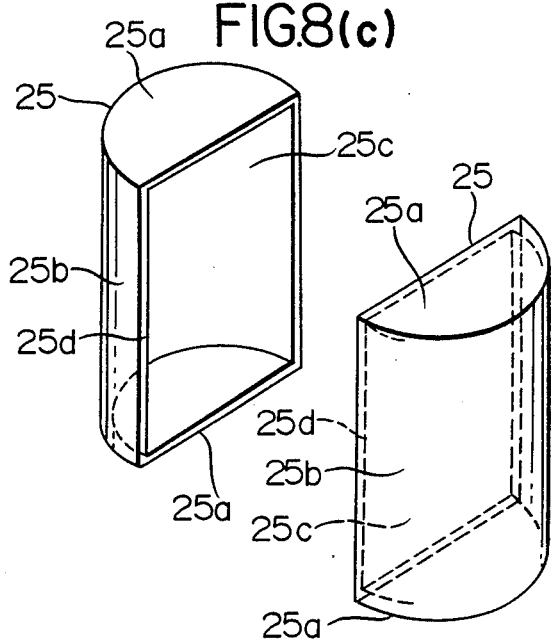
Figure 8B:
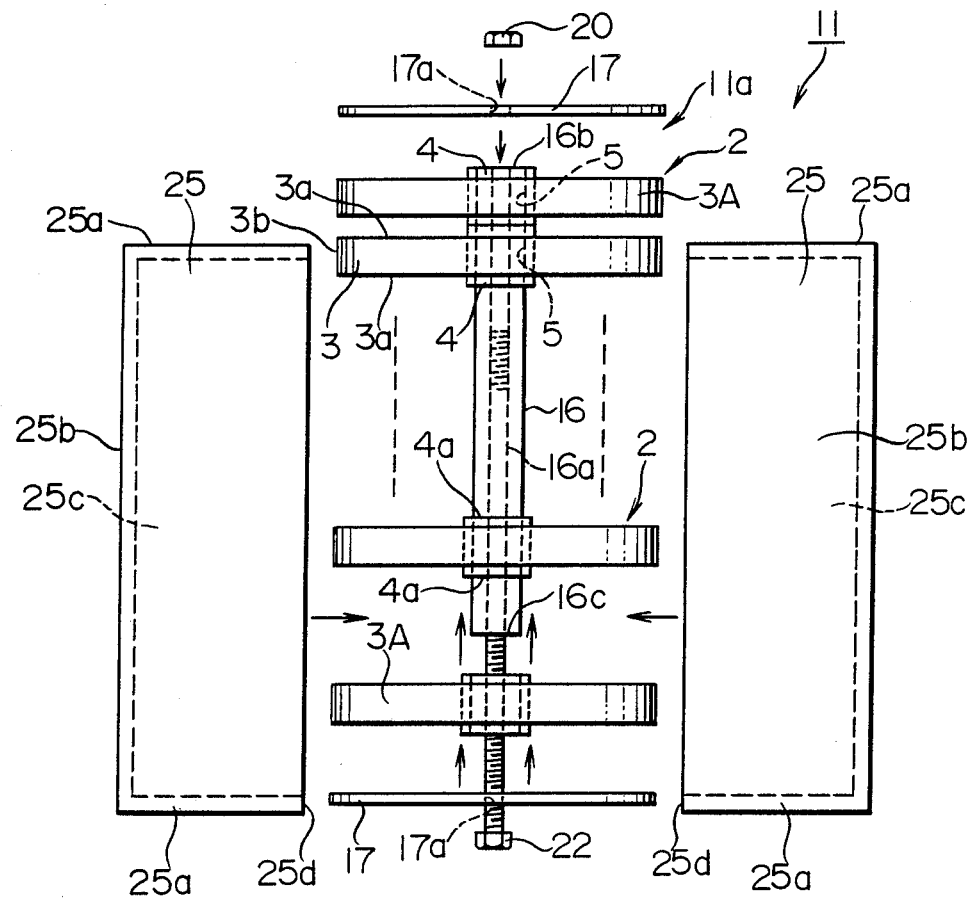
Figure 8D:
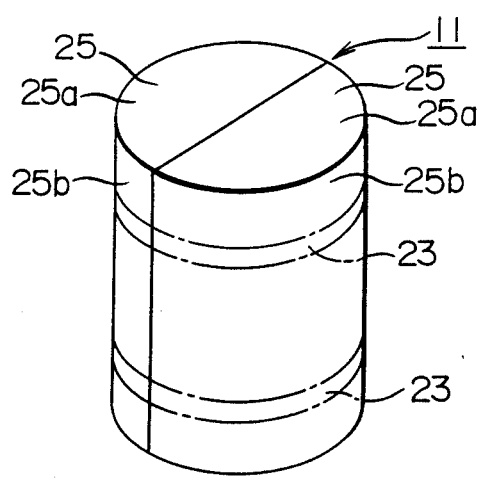

As shown in FIG. 8(c), the protector 25 comprises, a pair of stoppers 25a, facing with each other; and a sidewall member 25b that connects the stopper members 25a together and defines the positional relation of the stoppers 25a. Two protectors 25, for forming a pair, are positioned to face with each other, and the packaging structure 11a is loaded into a housing space 25c formed with the stopper member 25a and the sidewall member 25b, then joining faces 25d facing with each other are connected by means of bonding, thereby the status shown by FIGS. 8(a) and 8(d) is complete, thus the packaging structure 11 is complete. Additionally, as indicated by dash lines in FIG. 8(d), circumferential faces of the protectors 25 can be fastened with PP bands 23.

According to the present embodiment, the packaging structure 11 can have the effects similar to those of the packaging structure 1 described previously. Furthermore, the protector sidewall members 25b totally cover the overall circumferential face of the packaging structure 11a housed inside, and any portion of the packaging structure 11a is exposed. Accordingly, protection of articles against outside impact especially from a lateral direction is further perfected, thereby the articles being packaged are more positively protected even if the packaging structure 11 erroneously falls to ground or it collides against a certain object, thus reliability of the packaging structure is further enhanced.

In the case of the present embodiment, it is preferable that the diameter of the stopper members 17 is the same as or slightly larger than that of the pancakes 2, in order to prevent the pressure of the shrink packaging film 9 from being too strongly exerted onto the magnetic tapes 3A at both ends of the array of pancakes 10.

Figure 9:
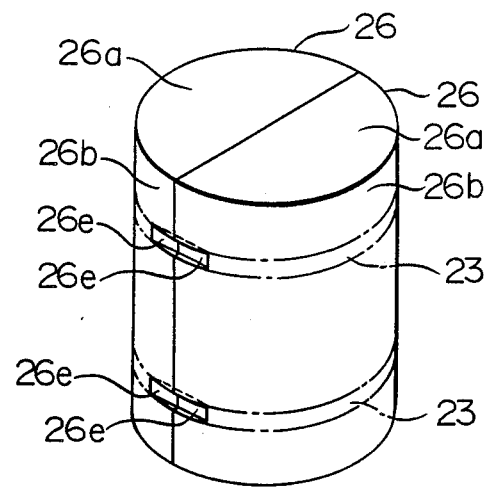

FIG. 9 is a perspective side view illustrating another protector 26.

The overall constitution of the protector 26 is similar to that of the protector 25 (refer to FIG. 8), and therefore the description thereof being omitted. In FIG. 9, numeral 26a represents a stopper portion; and 26b, a sidewall member.

The protector 26 is characterized by provision of a rectangular notches 26e on the sidewall member 26b, whereby when the package is prepared as shown in FIG. 9 and PP bands 23 are attached, the PP bands are allowed to be engaged with the notches 26e. Accordingly, once tightly secured, the PP bands do not come loose, and resulting is stronger bind, and the package seldom loosens.

Figure 10:
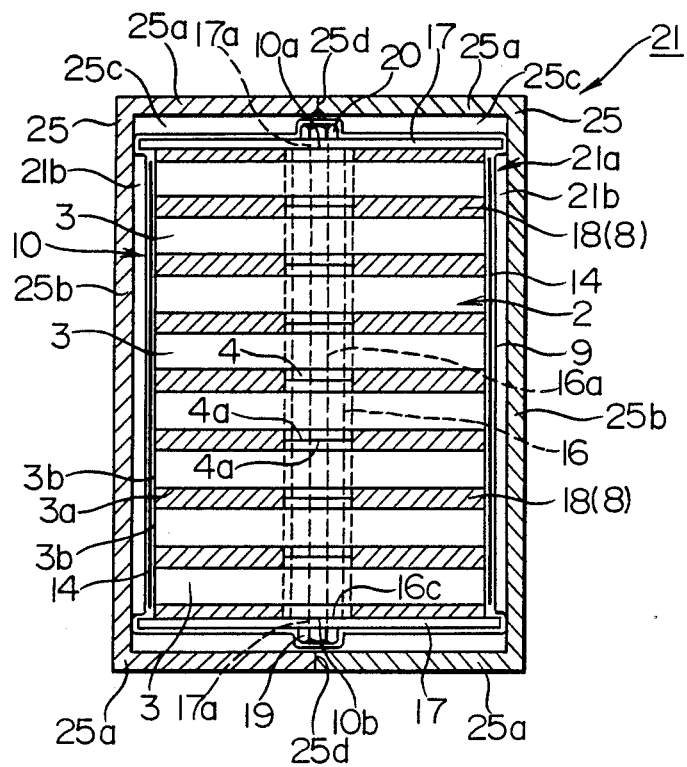

FIG. 10 is a cross-sectional view illustrating another packaging structure 21.

Figure 11:
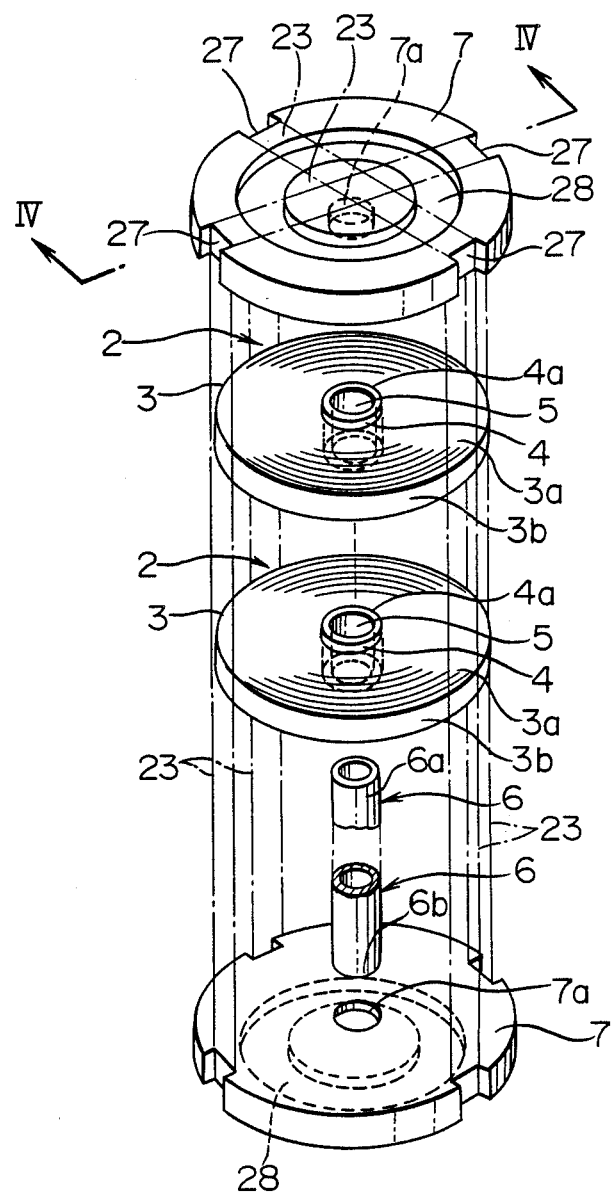

The overall constitution of the packaging structure 21 is roughly the same as that of the packaging structure 11 in FIG. 11, except in that the with the packaging structure 21, the diameter of the stopper members 17 is slightly larger than that of the pancakes 2, whereby there is formed a space 21b between the protector 25 and the inside packaging structure 21a (equivalent to the packaging structure 11a in FIG. 8). This arrangement further enhances protection against impact or the like. In each space 8 is disposed a ring shaped cushion 18, and there is a cylindrical protective sheet 14 between an array of pancakes 10 and a shrink packaging film 9.

Alternatively, the packaging structure 1a of FIG. 7 may be housed in the protectors 25 or 26 (refer to FIG. 8 or 9). According to this arrangement, the effects similar to those of the packaging structure 21 in FIG. 10 are available.

In regards with FIG. 7, various methods are available as a method for connecting and pressing both stopper members 22 that form a pair; for example, once securing each stopper plate 22 onto each stopper plate 7, the overall surface may be securely covered with a plastic film of the like. In FIGS. 7 through 10, use of a shrink packaging film is not mandatory. The configurations and dimensions and the like of the protectors 25 and 26 can be arbitrarily changed, and a plurality of packaging structures 1a or 11a refer to (FIG. 6 or 8) may be housed inside. Additionally, with the configuration of the housing space 25c unchanged, the external shape of the protector 25 may be changed to facilitate stacking; for example the shape can be a rectangular parallelopiped, or triangular column. The configuration of the stopper plate 17 can be one other than disk, and can be any of various shapes; for example a cross shaped type, or one comprising eight radially extending branches. However, regardless of the configuration, a preferred stopper plate has an external diameter larger than the diameter of a pancake.

The packaging structure 1 in FIG. 7 may be housed in the protectors 25 or 26 (refer to FIG. 8 or 9); binding may be exercised by spanning PP bands 23 around the protectors 25 as shown in FIG. 6.

Inside walls of the protectors 25 may be provided with recesses or through holes for positioning, whereby positioning is performed by engaging bolts 19, nuts 20, and stopper members 17 or the like with such recesses or through holes.

Figure 12:
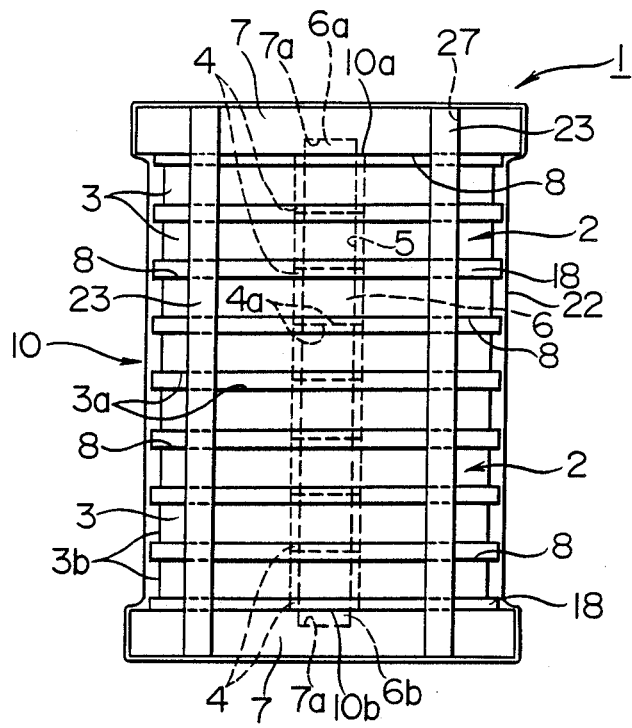

FIGS. 11 through 15 illustrate the ninth embodiment of the invention. As illustrated in FIG. 12, a plurality of pancakes 2 are arranged vertically and form an array of pancakes 10 as the end faces 4a of the hubs 4 are adjacent with each other, wherein the respective circumferential faces 3b of the magnetic tapes 3 are vertically aligned with each other, whereby in each pair of pancakes 2, the faces 3a of rolled magnetic tapes 3 face with each other via spaces 8.

Through a central hole 5 on each pancake 2 or the array of pancakes 10 penetrate a series of solid cylindrical or hollow cylindrical core members 6 that positively maintain the lateral position of each pancake 2. Between adjacent pancakes or at both ends of the array are disposed ring shaped cushions 16. Both outermost ends 6a and 6b of core members 6 protrude, from the through hole 5, on the array of pancakes 10. Both ends 6a and 6b are engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10 thereof to exert inward pressure.

At this status, both end stopper members 7—7 are connected together and secured by using plastic bands 23 that are engaged with four recesses 27 formed on the circumferential face of each stopper member, thereby both bands 23 cross with each other at a right angle on each stopper member 7. Correspondingly, both stopper members 7 are securely bound or connected together. According to this arrangement, the bands 23 are engaged with the recesses 27 to sufficient deepness, thereby the film 9 satisfactorily adheres around the recesses (refer to FIG. 14).

Figure 13:
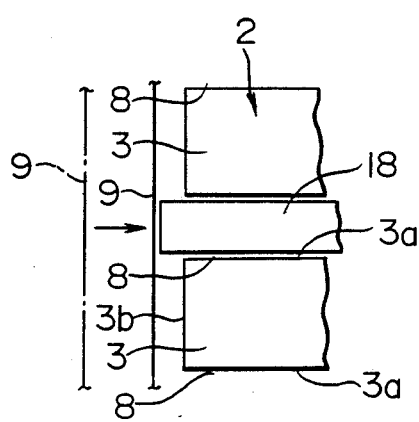
Figure 14:
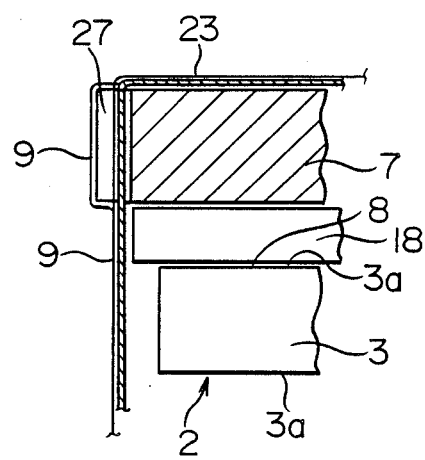

Furthermore, the overall surface of such a packaging structure is further wrapped with a film 9 known as a shrink film, reinforcing the packaging structure. As shown in FIGS. 13 and 14, when a shrink film 9 covers the external surface of the structure, it takes a profile as shown by dashed lines. Then the shrink film 9 is subjected to a heating process, thereby the film shrinks to take a profile shown by solid lines, and further pressing inward the stopper members 7. This arrangement further reinforces the packaging, and protects the contents against moisture or the like. Correspondingly, the magnetic tapes 3 are stably positioned, the tapes are protected against physical impact or the like, and the damage to the magnetic tapes is prevented. Furthermore, the pancakes (independent rolled magnetic tapes) 2 are not directly in contact with each other, and the tapes are free from damage possibly caused by mutual friction.

The above-mentioned pancake packaging structure is so simply constituted that a manufacturing process for each component such as a stopper member is simple, enabling cost reduction; the packaging procedure is simple; handling for transportation or storage is simple; and this simple structure is light weight and has good transportability.

Furthermore, using the bands 23 above can connect the stopper member 7 to the counterpart 7, so that the packaging with the shrink film 9 is further enhanced, thereby the packaging structure is further stabler.

On the top face or bottom of the stopper member is formed a ring shaped groove 28, providing a handy grip for transportation described later (see FIG. 15), and facilitating transportation.

The stopper member 7 can be made of foamed styrol or the like. The core member 6 can be made of vinyl chloride resin, paper or the like. The shrink film 9 can be made of various resins such as polypropylene, and polyethylene. The band 23 can be made of various resins such as polypropylene.

The preparation method of the above-described packaging structure is hereunder described.

Figure 15A:
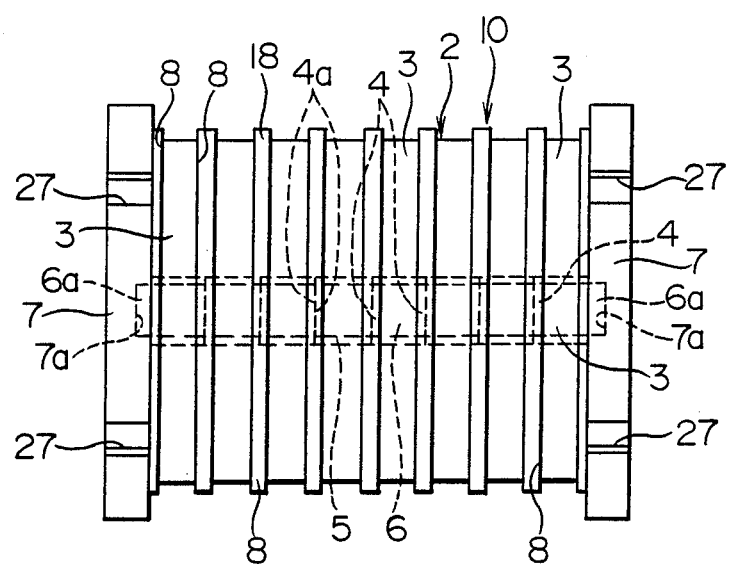

As illustrated in FIG. 15A, in a manner identical with that already described referring to FIG. 11, a plurality of pancakes 2 sandwiched between cushion members 18 are loaded onto a core member 6, and both ends of the core member 6 are engaged respectively with stopper members 7. This figure illustrates the packaging structure laid horizontally; this attitude is that taken in the actual packaging process (applicable hereunder).

Figure 15B:
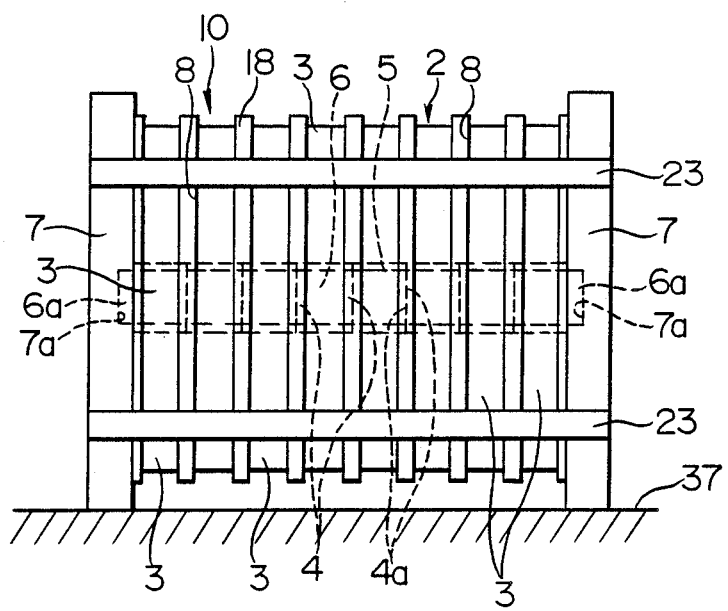

Next, as shown in FIG. 15B, binder bands 23 are engaged with recesses 27 on the stopper members 7, thereby the stopper members 7 and the core member 6 are securely bound together. As a result, the stopper members 7 do not depart from the core member 6, and the packaging structure can be subjected to the ensuing shrink process. In other words, as illustrated in FIG. 15B, an actual packaging process is performed while rolling the package on a floor 37 (or table); if not bound with bands 23, the stopper members 7 may depart from the core member 6. However, the stopper members 7 bound with the bands 23 do not come loose, and allow the packaging structure to be rolled to the shrink (wrapping) machine. To sum up, the packaging structures are stably conveyed to the shrink process.

Figure 15C:
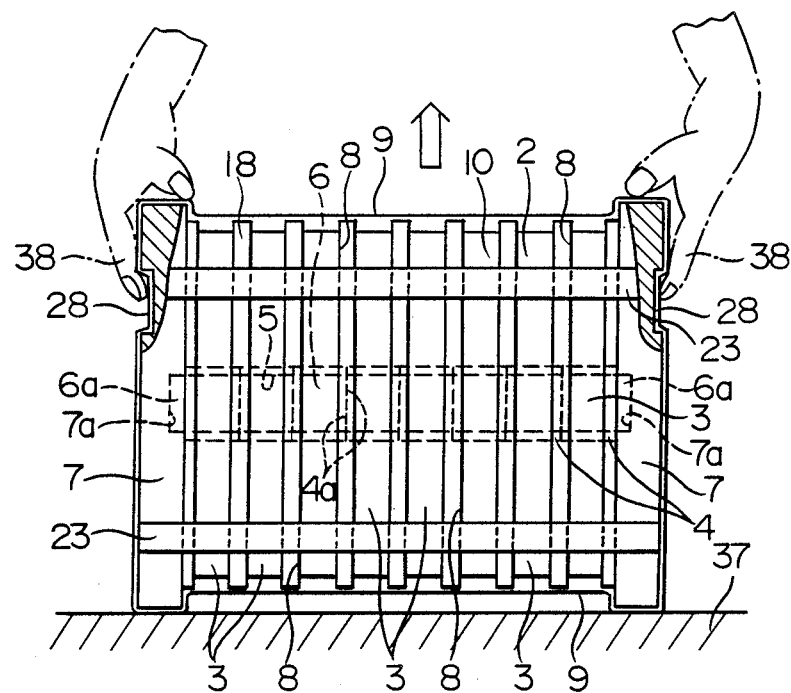

FIG. 15C illustrates a finally completed packaging structured of which overall surface has been wrapped with the shrink film 9 in the shrink process. When the packaged structure is held with fingers 38 or hands as indicated by dashed lines, fingers are inserted into the above-mentioned grooves 28 and the packaging structure is lifted as held at both ends. As fingers 38 grip the grooves, transportation is facilitated. This handiness also applies to the condition in FIG. 15B.

Figure 16:
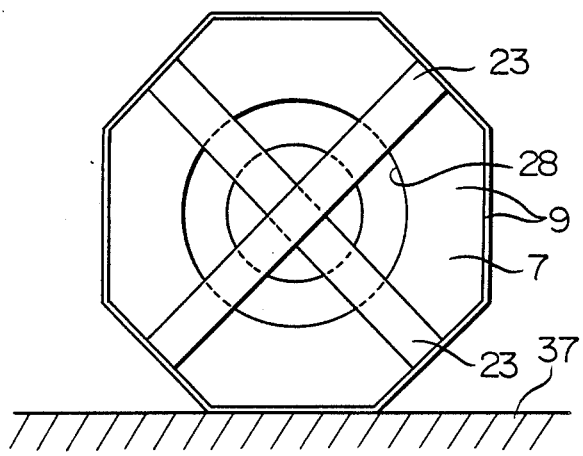

The packaging structure is comparatively stably stacked on a floor when the recess 27 is directly on the floor surface 37. However, if a stopper member 7 has a modified configuration for example octagonal type as in FIG. 16, the packaging structure is stacked on a floor with substantial stableness by positioning one side of the octagonal shape directly on the floor.

Figure 17:
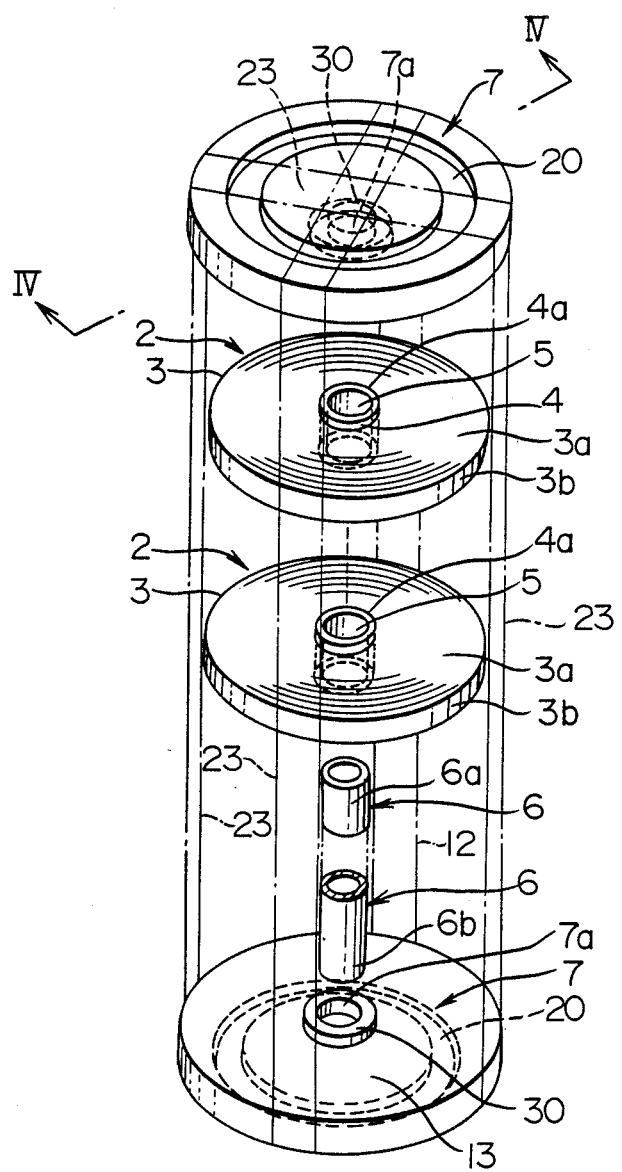
Figure 18:
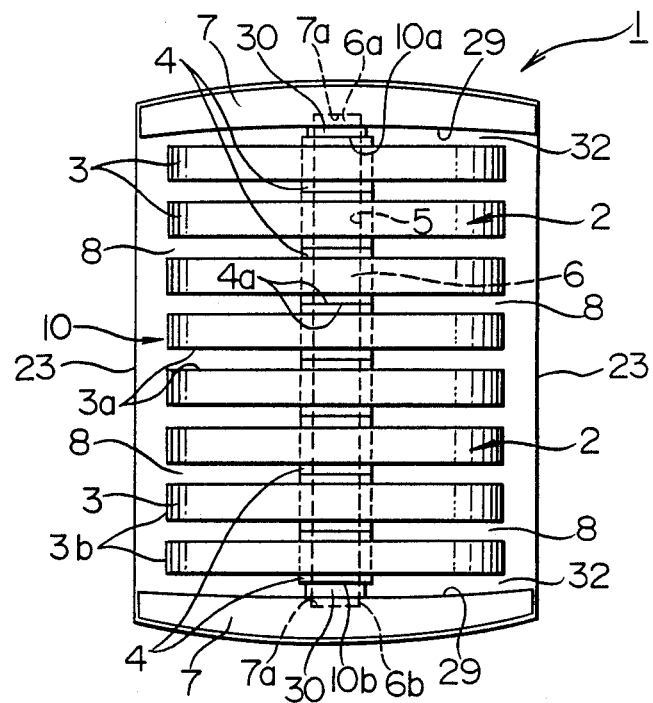

FIGS. 17 through 21 illustrates the tenth embodiment of the invention. As illustrated in FIG. 18, a plurality of pancakes 2 are arranged vertically and form an array of pancakes 10 as the end faces 4a of the hubs 4 are adjacent with each other, wherein the respective circumferential faces 3b of the magnetic tapes 3 are vertically aligned with each other, whereby in each pair of pancakes 2, the faces 3a of rolled magnetic tapes 3 face with each other via spaces 8.

Through a central hole 5 on each pancake 2 or the array of pancakes 10 penetrate a series of solid cylindrical or hollow cylindrical core members 6 that positively maintain the lateral position of each pancake 2. Both outermost ends 6a and 6b of core members 6 protrude, from the through hole 5, on the array of pancakes 10. Both ends 6a and 6b are engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10 thereof to exert inward pressure.

At this status, both end stopper members 7—7 are connected together and secured by using plastic bands 23 that are engaged with four recesses (unshown in the figure) formed on the circumferential face of each stopper member, thereby both bands 23 cross with each other at a right angle on each stopper member 7. Correspondingly, both stopper members 7 are securely bound or connected together.

Figure 19:
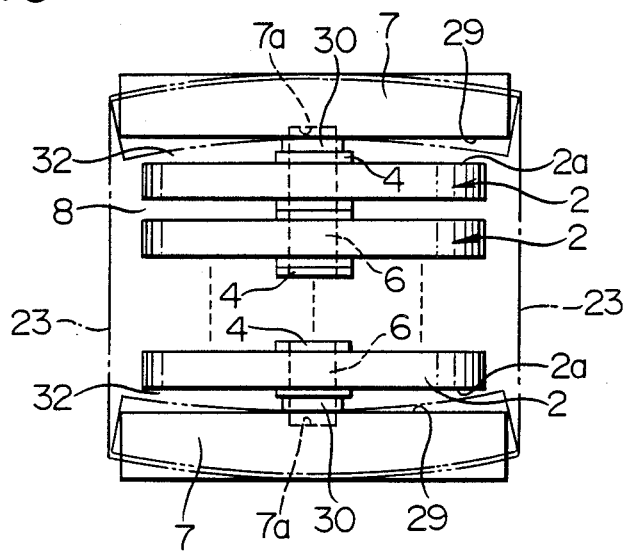

According to this arrangement, as shown in FIGS. 17 and 19, the inside face of the stopper member 7 (a face directly facing the pancake 2) has in its central portion an integrally formed ring shaped protrusion 30 serving as a boss, whereby the protrusion 30 engages with the hub 4 of the pancake 2. The diameter of the protrusion 30 is the same as or slightly smaller than hub 4. The stopper member 7 can be formed with foamed styrol or the like. The core member 6 can be formed with vinyl chloride resin, paper or the like. The band 23 can be formed with various resins such as polypropylene.

Tension exerted by the bands 23 inwardly deforms both stopper members 7 as shown by dashed lines in FIG. 19. In the original shape, the stopper member has the protrusion 30 of a specific height (for example, 3 mm or larger), and therefore, the inside face 29 of the stopper member is prevented from coming into contact with the circumferential face 2a of the pancake 2. In other words, even after deformation, a specific space 32 positively remains, as shown in the figure, between the inside face 29 and the circumferential face 2a.

Alternatively, according to this embodiment, a ring shaped cushion (unshown) may be disposed between adjacent pancakes. Also, both ends of an array of pancakes (inside the stopper member 7) are not necessarily provided with similar ring shaped cushions; if the ring shaped cushions are so disposed, the circumferential faces of pancakes are not subjected to excessive pressure by the above-mentioned deformation.

Figure 20:
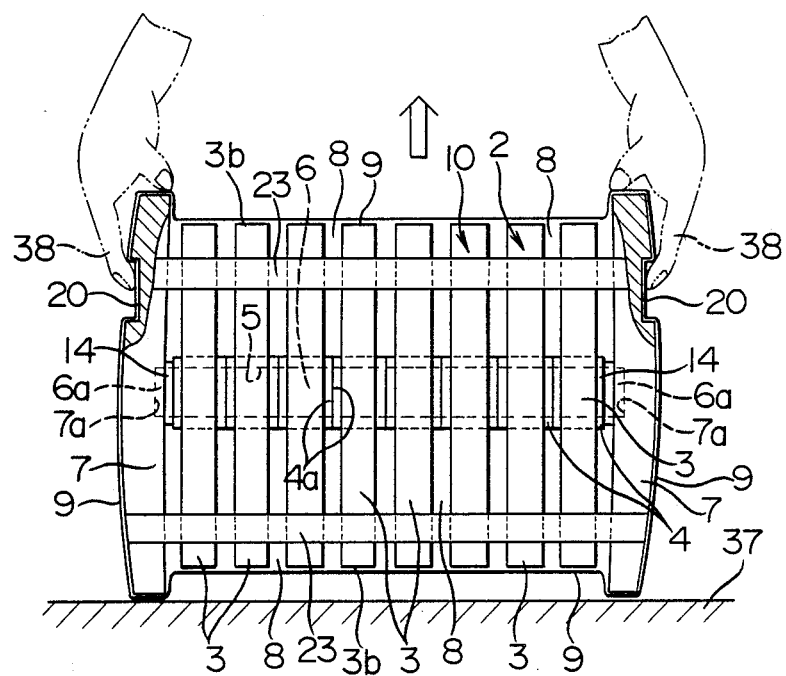

Once bound by the bands, the overall surface of such a packaging structure is further wrapped as shown in FIG. 20 with a film 9 known as a shrink film made of various resins such as polypropylene and polyethylene, thus the packaging structure is reinforced. When the shrink film 9 covers the external surface of the structure, there is a marginal space between the shrink film and the packaging structure. Then the shrink film 9 is subjected to a heating process, thereby the film shrinks to take a profile shown by solid lines as shown in FIG. 20, and further pressing inward the stopper members 7 together with the bands 23. This arrangement further reinforces the packaging, and protects the contents against moisture or the like. Correspondingly, the magnetic tapes 3 are stably positioned, the tapes are protected against physical impact or the like, and the damage to the magnetic tapes is prevented. Furthermore, the pancakes (independent rolled magnetic tapes) 2 are not directly in contact with each other, and the tapes are free from damage possibly caused by mutual friction.

The above-mentioned pancake packaging structure is so simply constituted that a manufacturing process for each component such as a stopper member is simple, enabling cost reduction; the packaging procedure is simple; handling for transportation or storage is simple; and this simple structure is light weight and has good transportability.

Furthermore, though the stopper member 7 is deformed as in FIG. 19 when bound with the above-mentioned bands 23, the inside face of the stopper member 7 does not come into contact with the circumferential face 2a of a pancake, therefore the circumferential face of the magnetic tape 3 is not damaged. This arrangement is achieved simply by integrally forming the protrusion 30 on the stopper member, and, therefore, a manufacturing cost does not increase.

Figure 21:
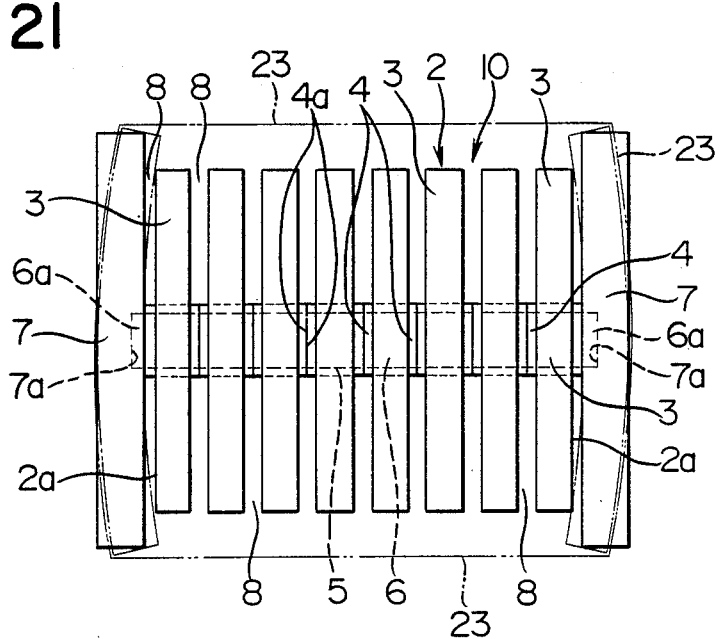

In contrast, as indicated by solid lines in FIG. 21, if a stopper member 7 lacks the above-mentioned protrusion 30 and if its original shape is already in close proximity of a pancake 2, and, once the stopper member 7 is deformed with the tension of bands 23 as indicated by dashed lines, the stopper member 7 comes into contact with the circumferential face 2a of the pancake, thereby the magnetic tapes are damaged.

Using the bands 23, the stopper members 7—7 are bound together, and packaging is satisfactorily reinforced with the shrink film 9, thereby the final packaging structure is positively stable.

A ring shaped groove 20 disposed on the upper face or bottom face of the stopper member 7 allows, as shown in FIG. 20, the packaging structure to be readily held with fingers 38 or hand as it is transported from a supporting face 37. This advantage is also valid even after binding with the bands 23 shown in FIG. 18.

Figure 22:
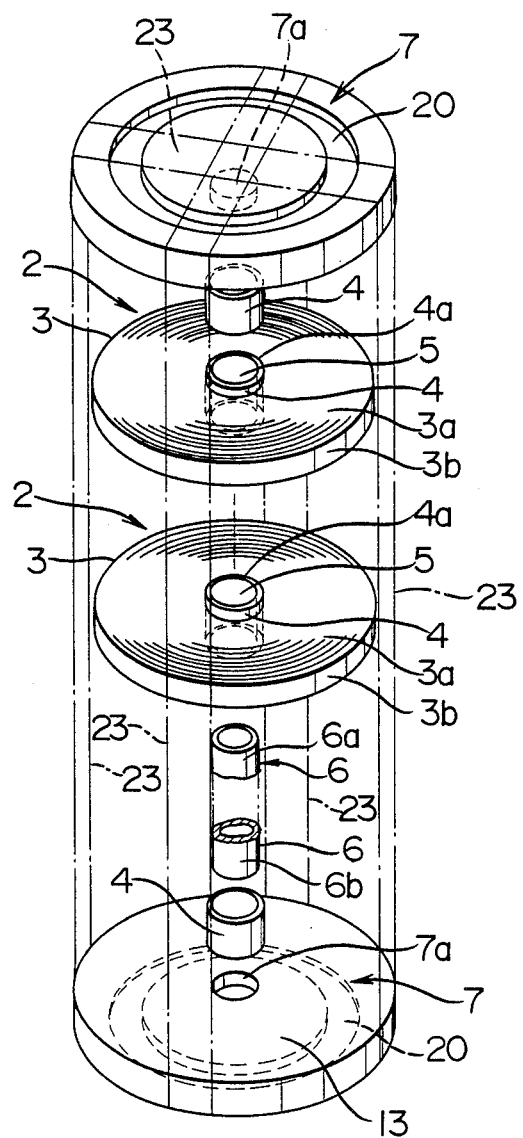
Figure 23:
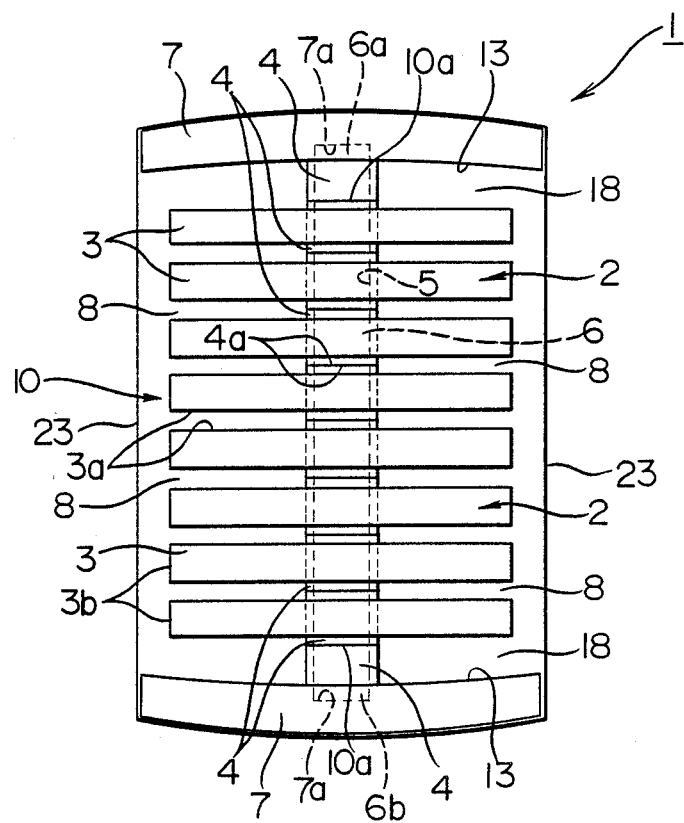

Referring now to FIGS. 22 and 23, the eleventh and twelfth embodiments of the invention are hereunder described.

According to these embodiments, basic packaging structures are similar to those described above. However, these structures are characterized in that an empty hub 4 is held sandwiched between a hub 4 of each endmost pancake 2 and the center portion of each stopper member 7. These empty hubs 4 (cores not having magnetic tapes 3) provide sufficient space between the inside faces 29 of the stopper members 7 and the circumferential faces 2a of pancakes. Accordingly, the stopper members 7 even deformed by the pressure of the bands do not come into contact with pancakes, thereby the magnetic tapes are protected against damage. Additionally, this arrangement only entails empty hubs 4 being disposed on both ends of the array of pancakes and allows ordinary hubs to be used unchanged; and ordinary stopper members 7 can be used unchanged. Accordingly, a manufacturing cost is further lower, and fabricating is simpler.

The prevent invention has been thus described. These preferred embodiments can be further modified based on the technical concept of the invention.

For example, unlike in the above embodiments, only one band 23 may be used to connect stoppers. The band can be replaces with a string, chain, or another connecting member. The internal configuration of the stopper member 7 (in particular, a ring shaped protrusion) is not limited to those described above; it can be any form as far as the deformed stopper member 7 does not come into contact with the circumferential faces of pancakes. Unlike continuous one, the protrusion can be incotinuous type.

The above embodiments are based on the use of bands 23. However, depending on circumstances, the packaging structure can be bound together solely using a shrink film 9 without using bands 23. In this case, however, the stopper member 7 may be also deformed as mentioned above by pressure from the shrink film 9. Accordingly, the invention can be applicable to this case. Additionally, to position the stopper members 7 relative to core member 6 is effected by engaging or gluing the former members with the latter, or another means.

Figure 24:
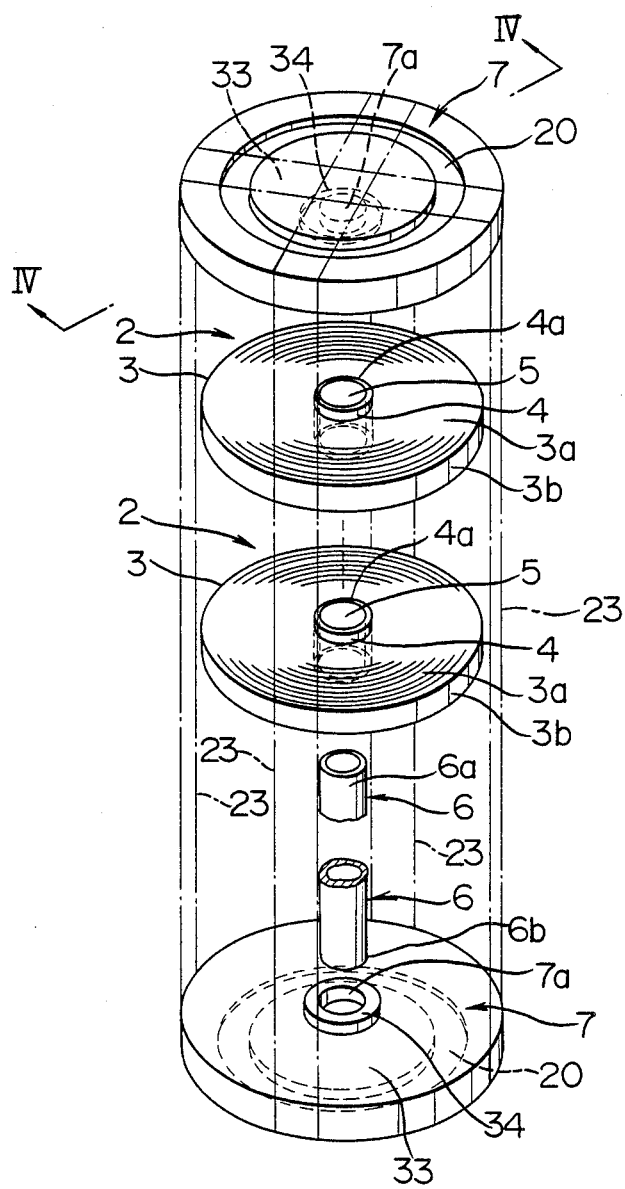
Figure 25:
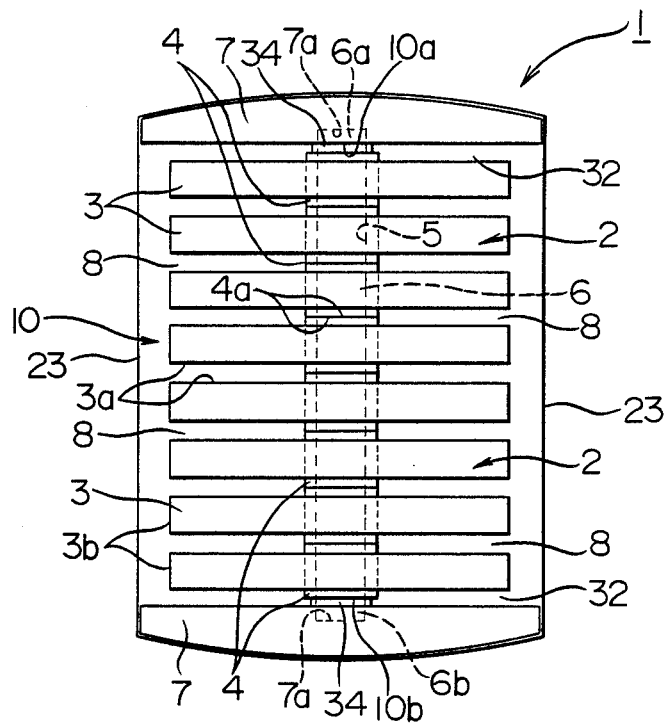

FIGS. 24 through 28 illustrates the thirteenth embodiment of the invention. As illustrated in FIG. 25, a plurality of pancakes 2 are arranged vertically and form an array of pancakes 10 as the end faces 4a of the hubs 4 are adjacent with each other, wherein the respective circumferential faces 3b of the magnetic tapes 3 are vertically aligned with each other, whereby in each pair of pancakes 2, the faces 3a of rolled magnetic tapes 3 face with each other via spaces 8.

Through a central hole 5 on each pancake 2 or the array of pancakes 10 penetrate a series of solid cylindrical or hollow cylindrical core members 6 that positively maintain the lateral position of each pancake 2. Both ends 6a and 6b are engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10 thereof to exert inward pressure.

At this status, both end stopper members 7—7 are connected together and secured by using plastic bands 12 that are engaged with four recesses (unshown in the figure) formed on the circumferential face of each stopper member, thereby both bands 12 cross with each other at a right angle on each stopper member 7. Correspondingly, both stopper members 7 are securely bound or connected together.

Figure 26:
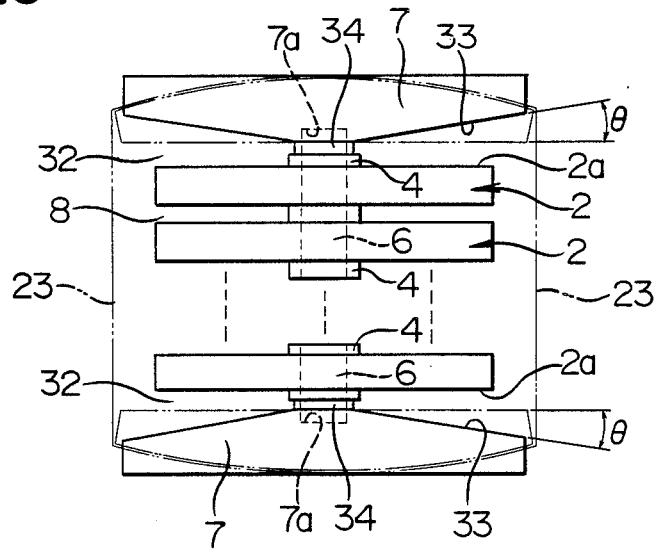

According to this arrangement, as shown in FIGS. 24 and 26, the inside face of the stopper member 7 (a face directly facing the pancake 2) is tapered from the center toward circumference (cone shaped plate 33) at $\theta$ degrees, and, additionally, the center thereof forms a boss portion 34 into which the core member 6 is inserted. The stopper member 7 can be formed with foamed styrol or the like. The core member 6 can be formed with vinyl chloride resin, paper or the like. The band 23 can be formed with various resins such as polypropylene.

Tension exerted by the bands 23 inwardly deforms both stopper members 7 as shown by dashed lines in FIG. 26. In the original shape, the stopper member has the protrusion 34 of a specific height (for example, 3 mm or larger), and therefore, the inside face 33 of the stopper member is prevented from coming into contact with the circumferential face 2a of the pancake 2. In other words, even after deformation, a specific space 32 positively remains, as shown in the figure, between the inside face 33 and the circumferential face 2a.

Alternatively, according to this embodiment, a ring shaped cushion (unshown) may be disposed between adjacent pancakes. Also, both ends of an array of pancakes (inside the stopper member 7) are not necessarily provided with similar ring shaped cushions; if the ring shaped cushions are so disposed, the circumferential faces of pancakes are not subjected to excessive pressure by the above-mentioned deformation.

Figure 27:
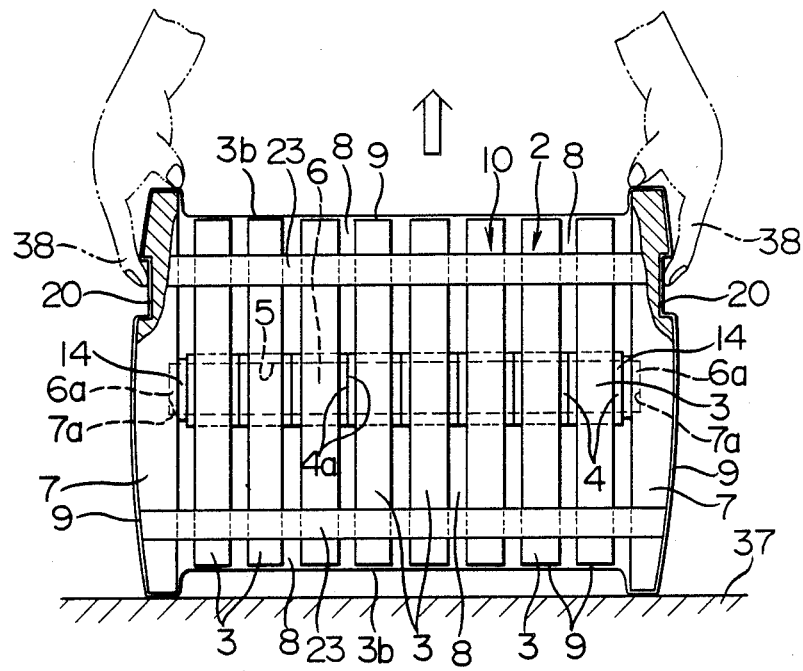

Once bound by the bands, the overall surface of such a packaging structure is further wrapped as shown in FIG. 27 with a film 9 known as a shrink film made of various resins such as polypropylene and polyethylene, thus the packaging structure is reinforced. When the shrink film 9 covers the external surface of the structure, there is a marginal space between the shrink film and the packaging structure. Then the shrink film 9 is subjected to a heating process, thereby the film shrinks to take a profile shown by solid lines as shown in FIG. 27, and further pressing inward the stopper members 7 together with the bands 23. This arrangement further reinforces the packaging, and protects the contents against moisture or the like. Correspondingly, the magnetic tapes 3 are stably positioned, the tapes are protected against physical impact or the like, and the damage to the magnetic tapes is prevented. Furthermore, the pancakes (independent rolled magnetic tapes) 2 are not directly in contact with each other, and the tapes are free from damage possibly caused by mutual friction.

The above-mentioned pancake packaging structure is so simply constituted that a manufacturing process for each component such as a stopper member is simple, enabling cost reduction; the packaging procedure is simple; handling for transportation or storage is simple; and this simple structure is light weight and has good transportability.

Furthermore, though the stopper member 7 is deformed as in FIG. 26 when bound with the above-mentioned bands 23, the inside face of the stopper member 7 does not come into contact with the circumferential face 2a of a pancake, therefore the circumferential face of the magnetic tape 3 is not damaged. The inside conditions are visible through a transparent shrink film 9, thereby good appearance is provided.

Figure 28:
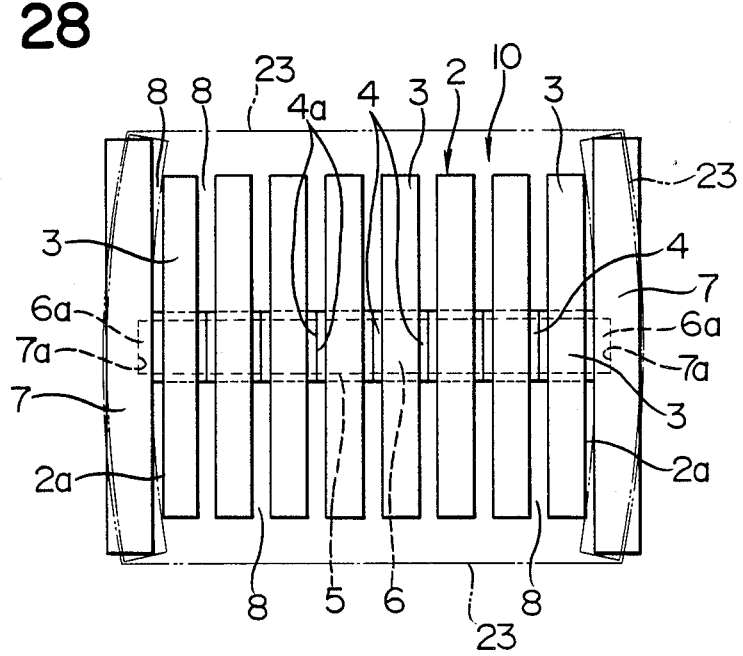

In contrast, as indicated by solid lines in FIG. 28, if the original shape of a stopper member 7 is substantially parallel to a pancake 2, and, once the stopper member 7 is deformed with the tension of bands 23 as indicated by dashed lines, the stopper member 7 comes into contact with the circumferential face 2a of the pancake, thereby the magnetic tapes may be damaged, and good appearance is not attained.

Using the bands 23, the stopper members 7—7 are bound together, and packaging is satisfactorily reinforced with the shrink film 9, thereby the final packaging structure is positively stable.

A ring shaped groove 20 disposed on the upper face or bottom face of the stopper member 7 allows, as shown in FIG. 27, the packaging structure to be readily held with fingers 38 or hand as it is transported from a supporting face 37. This advantage is also valid even after binding with the bands 23 shown in FIG. 25.

Figure 29:
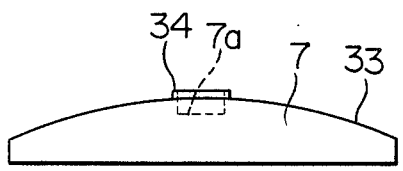

FIG. 29 illustrates a modified stopper member 7 that has a round or circular face instead of the linear taper 33 mentioned previously. However, this stopper member also provides an effect the same as that mentioned previously.

Figure 30:
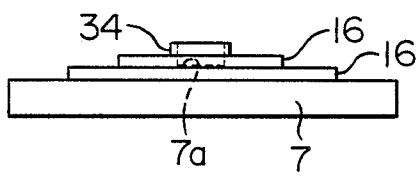

A modified stopper member 7 in FIG. 30 has a plurality of steps on the similar face. This stopper member also provides an effect the same as that mentioned above.

Figure 31:
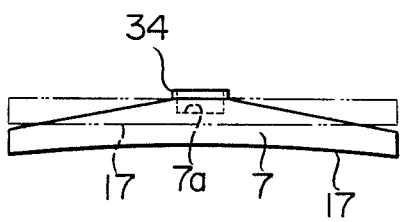

The example in FIG. 31 is basically the same as those in FIGS. 24 through 26, except that an outer face 17 of a stopper member 7 is concave-shaped. Accordingly, the outer face of the deformed stopper member 7 does not take such a convex shape as shown in FIG. 25; it takes a flat outline as shown by dashed lines.

Figure 32:
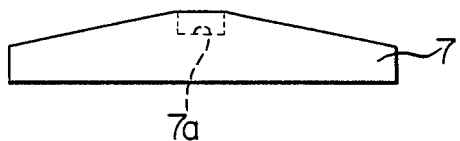
Figure 33:
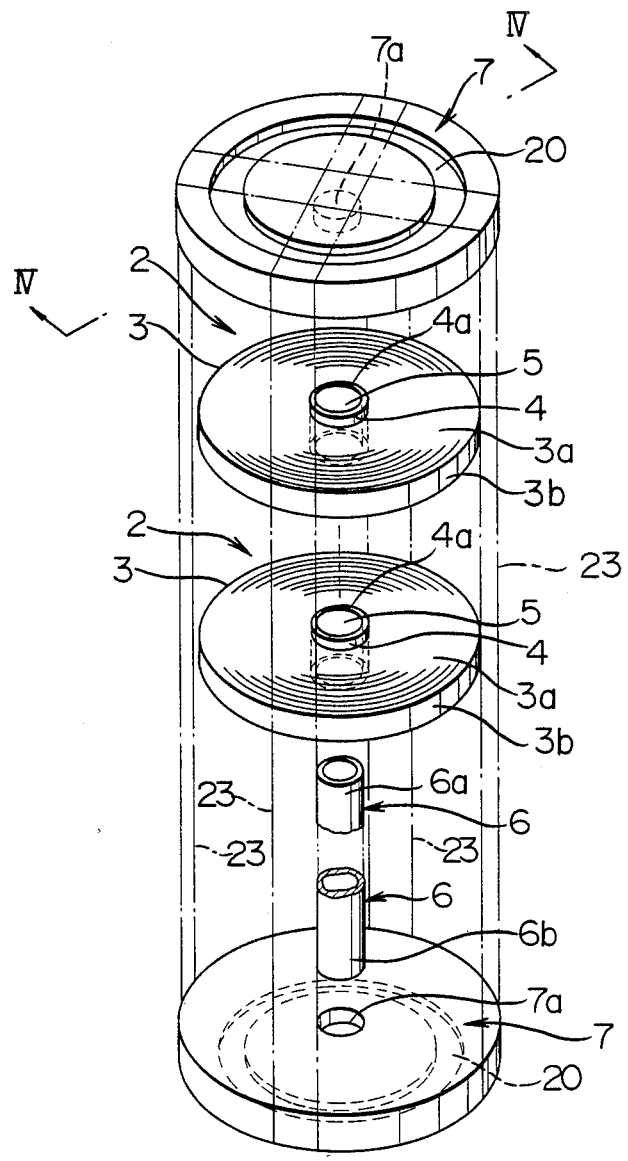

Optionally, as shown in FIG. 32, the invention is applicable to a stopper member lacking the boss portion 34 that was shown in FIG. 24.

The invention has been thus exemplified above. However, this embodiment can be further modified based on the technical concept of the invention. For example, the internal shape of a stopper member 7 is not limited only to those described above, and can be any shape as far as a deformed stopper member 7 does not come into contact with the circumferential face of a pancake.

Figure 34:
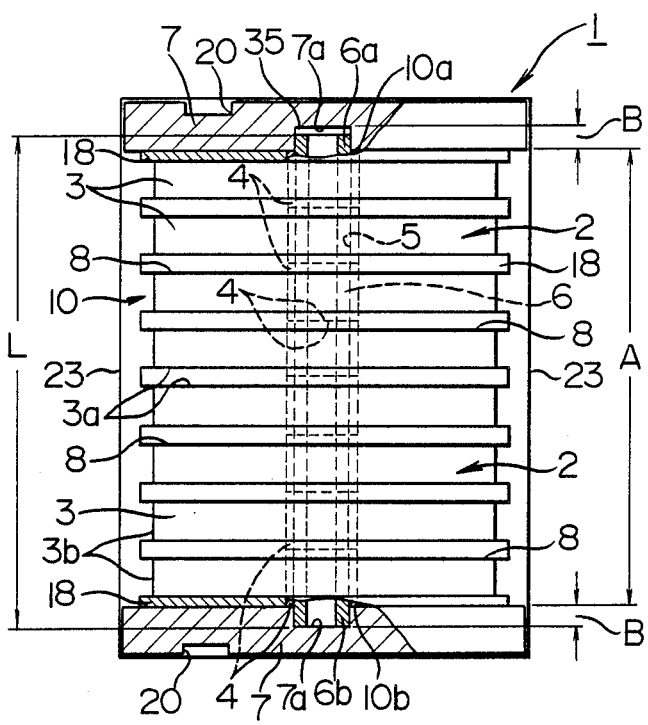
Figure 35A:
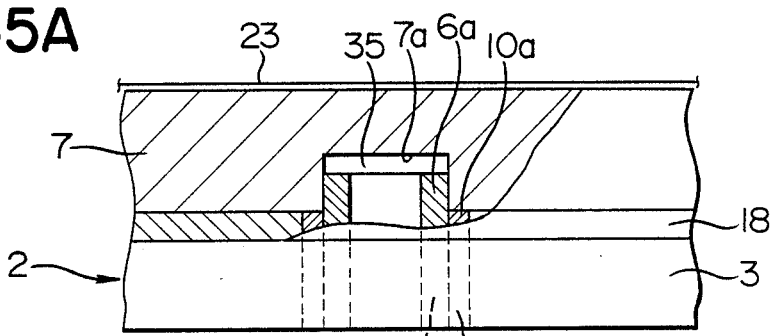
Figure 35B:
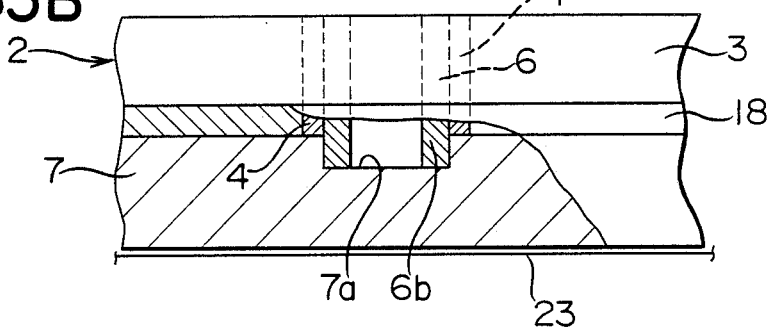

FIGS. 33 through 37 illustrates the fourteenth embodiment of the invention. As illustrated in FIG. 34, a plurality of pancakes 2 are arranged vertically and form an array of pancakes 10 as the end faces 4a of the hubs 4 are adjacent with each other, wherein the respective circumferential faces 3b of the magnetic tapes 3 are vertically aligned with each other, whereby in each pair of pancakes 2, the faces 3a of rolled magnetic tapes 3 face with each other via spaces 8.

Through a central hole 5 on each pancake 2 or the array of pancakes 10 penetrate a series of solid cylindrical or hollow cylindrical core members 6 that positively maintain the lateral position of each pancake 2. Between each adjacent pancakes or on both end faces of the array of pancakes are respectively disposed ring shaped cushions 18. Both ends 6a and 6b are tightly engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10 thereof to exert inward pressure.

At this status, both end stopper members 7—7 are connected together and secured by using plastic bands 23 that are engaged with four recesses (unshown in the figure) formed on the circumferential face of each stopper member, thereby both bands 23 cross with each other at a right angle on each stopper member 7. Correspondingly, both stopper members 7 are securely bound or connected together.

The stopper member 7 can be formed with foamed styrol or the like. The core member 6 can be formed with vinyl chloride resin, paper or the like. The band 23 can be formed with various resins such as polypropylene.

Figure 36:
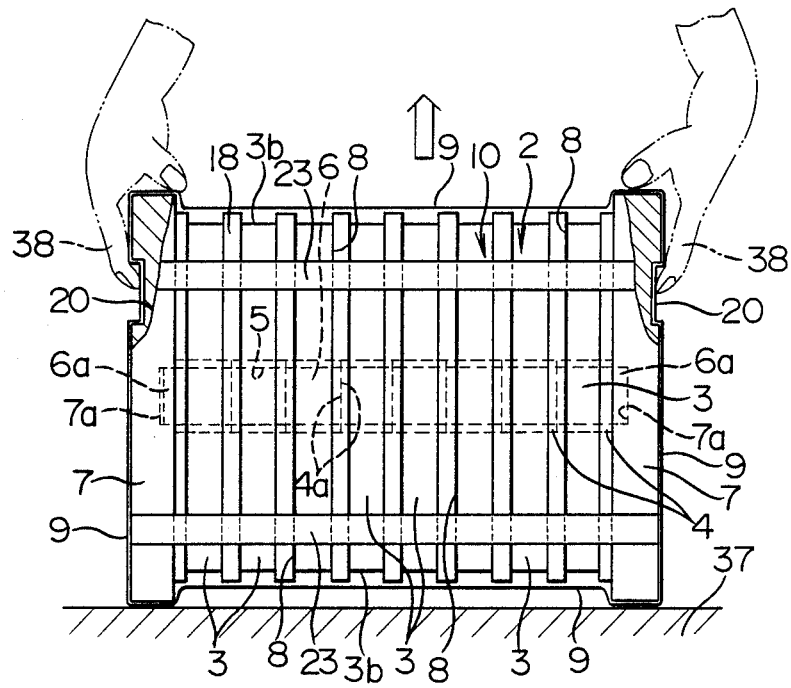

Once bound by the bands, the overall surface of such a packaging structure is further wrapped as shown in FIG. 36 with a film 9 known as a shrink film made of various resins such as polypropylene and polyethylene, thus the packaging structure is reinforced. When the shrink film 9 covers the external surface of the structure, there is a space between the shrink film and the packaging structure. Then the shrink film 9 is subjected to a heating process, thereby the film shrinks to take a profile shown by solid lines as shown in FIG. 36, and further pressing inward the stopper members 7 together with the bands 23. This arrangement further reinforces the packaging, and protects the contents against moisture or the like. Correspondingly, the magnetic tapes 3 are stably positioned, the tapes are protected against physical impact or the like, and the damage to the magnetic tapes is prevented. Furthermore, the pancakes (independent rolled magnetic tapes) 2 are not directly in contact with each other, and the tapes are free from damage possibly caused by mutual friction.

It should be noted that according to the above-mentioned packaging structure, the expression below defining the positional relation in FIG. 34 is valid:

$$A < L < A + 2B$$

where L represents the length of the core member 6; A, the length of the array of pancakes 10; and B, the depth of the hole 7a of the stopper member 7.

Figure 37:
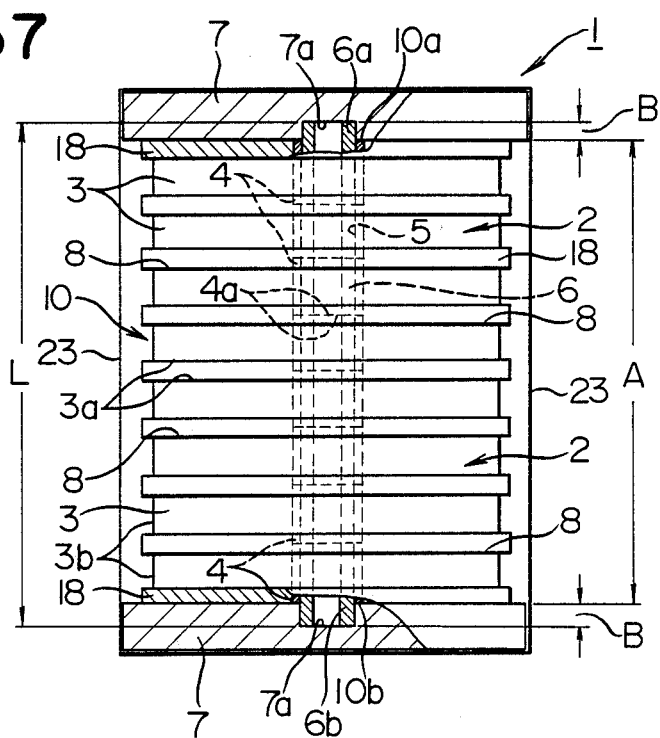

When this expression is valid, there is always present a specific (for example, 1 to 2 mm) clearance 35 on at least one end (the upper end, in this figure) of the core member 6 between the bottom of the hole 7a of the stopper member and the core member 6 when the bands 12 have bound the packaging structure. In other words, under the fastening force of the bands 23, both end faces 10a and 10b of the array of pancakes 10 receive inward force from the stopper members 7, thereby both ends of the array of pancakes 10 receive, on its both ends, strong inward pressure, and is securely held between both stopper members 7 and 7. Accordingly, deliberately determining the size of the clearance 35 (i.e. A+2B−L) can attain positively stable packaging. In contrast, as indicated in FIG. 37, if L≧A+2B, and when packaging is performed (belts are attached), both ends of the core member 7 positively come into contact with the inside ends of the holes 7a of the stopper members 7, thereby clearances positively develop between the stopper members 7 and the array of pancakes 10. Accordingly, the pancakes 2 fail to be securely held between the stopper members 7 and 7, and there will be play between pancakes 2. Furthermore, because of unstable pancakes 2, the stopper members 7 more readily depart from the packaging structure in the course of attaching the belts.

According to the present embodiment, both ends of the core member 6 fail to engage with the holes 7a unless L satisfies L>A; the array of pancakes will not be stably maintained. Accordingly, L is compulsorily larger than A.

Additionally, the above-mentioned pancake packaging structure is so simply constituted that a manufacturing process for each component such as a stopper member is simple, enabling cost reduction; the packaging procedure is simple; handling for transportation or storage is simple; and this simple structure is light weight and has good transportability.

Furthermore, using the bands 23 can connect the stopper member 7 to the counterpart 7, so that the packaging with the shrink film 9 is further enhanced, thereby the packaging structure is further stabler. According to this shrink packaging, the film exerts pressure both on the stopper members 7 and the pancakes 2. Accordingly, the pancakes are more stably positioned.

A ring shaped groove 20 disposed on the upper face or bottom face of the stopper member 7 allows, as shown in FIG. 36, the packaging structure to be readily held with fingers 15 or hand as it is transported from a supporting face 24. This advantage is also valid even after binding with the bands 23 shown in FIG. 34.

Figure 38:
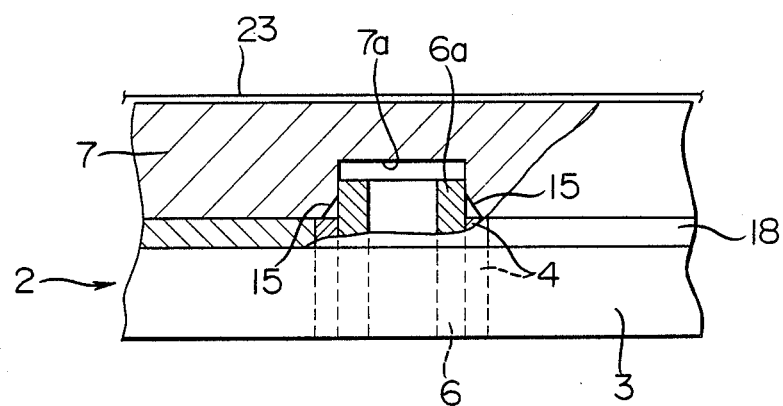

FIG. 38 illustrates on modification, where a stopper member 7 has a modified hole 7a, and the side for insertion on a core member 6 is provided with a ring formed taper 15. The taper 15 allows the core member 6 to be readily inserted into the hole 7a, and, at the same time, since the core member 6 is tightly held in the hole 7a, it seldom departs from the hole 7a.

Figure 39:
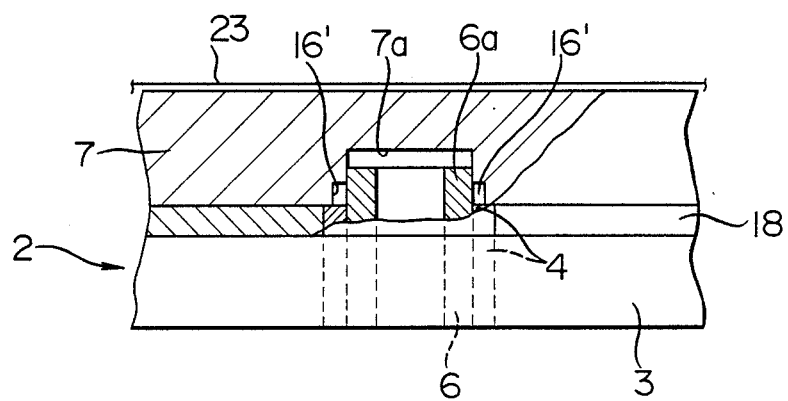

FIG. 39 illustrates another modification, where the taper is replaced with a ring formed step 16.

The invention has been thus exemplified above. However, this embodiment can be further modified based on the technical concept of the invention.

For example, the dimensions of the above-mentioned L, A, and B can be variously modified, and the clearance 35 may be present at both ends of the packaging structure.

Figure 40:
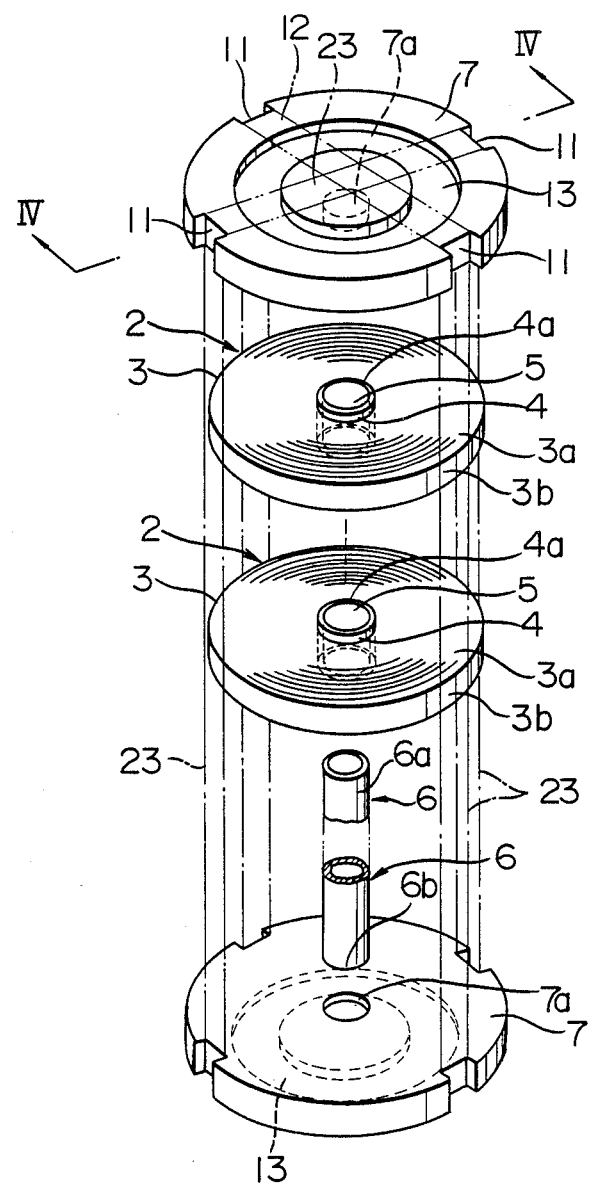
Figure 41:
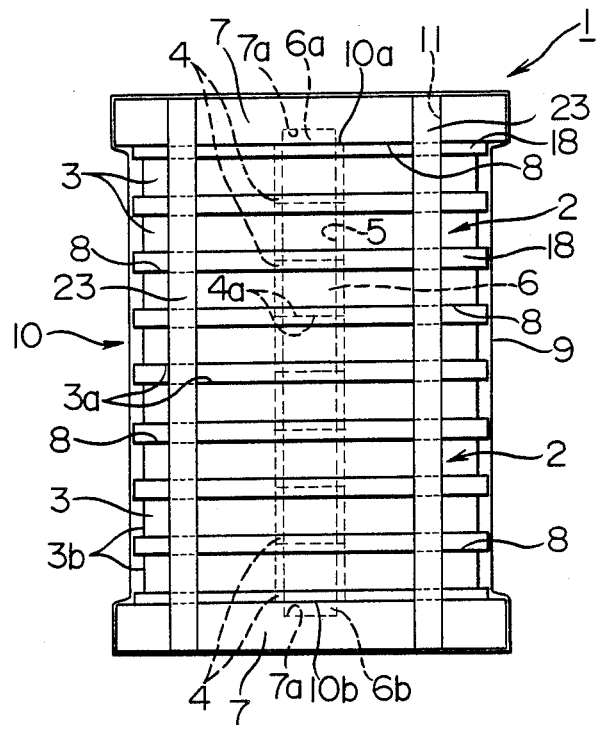

FIGS. 40 through 45 illustrates the fifteenth embodiment of the invention. As illustrated in FIG. 41, a plurality of pancakes 2 are arranged vertically and form an array of pancakes 10 as the end faces 4a of the hubs 4 are adjacent with each other, wherein the respective circumferential faces 3b of the magnetic tapes 3 are vertically aligned with each other, whereby in each pair of pancakes 2, the faces 3a of rolled magnetic tapes 3 face with each other via spaces 8.

Through a central hole 5 on each pancake 2 or the array of pancakes 10 penetrate a series of solid cylindrical or hollow cylindrical core members 6 that positively maintain the lateral position of each pancake 2. Between each adjacent pancakes or on both end faces of the array of pancakes are respectively disposed ring shaped cushions 16. Both ends 6a and 6b are tightly engaged respectively with holes 7a on respective disc shaped stopper members (plates) 7, thereby the core members 6 and the stopper members 7 are secured with each other. Under this condition, the stopper members 7 sandwich the array of pancakes 10, allowing ends 10a and 10 thereof to exert inward pressure.

At this status, both end stopper members 7—7 are connected together and secured by using plastic bands 23 that are engaged with four recesses 11 formed on the circumferential face of each stopper member, thereby both bands 23 cross with each other for example at a right angle on each stopper member 7. Correspondingly, both stopper members 7 are securely bound or connected together. According to this arrangement, the bands 23 are engaged with the recesses 11 to sufficient deepness, thereby the film 9 satisfactorily adheres around the recesses (refer to FIG. 43).

Figure 42:
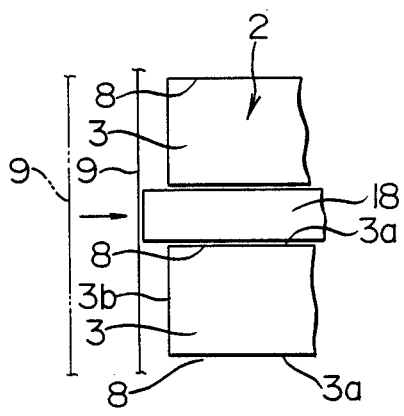
Figure 43:
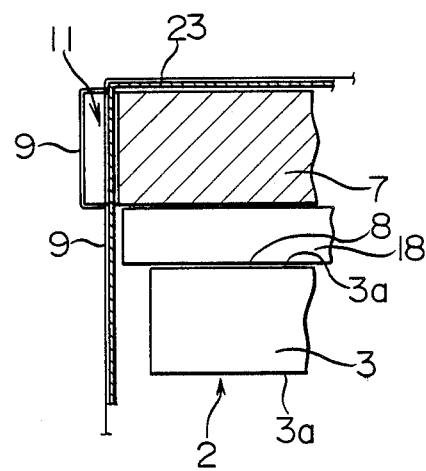

Furthermore, the overall surface of such a packaging structure is further wrapped with a film 9 known as a shrink film, reinforcing the packaging structure. As shown in FIGS. 42 and 43, when a shrink film 9 covers the external surface of the structure, it takes a profile as shown by dashed lines. Then the shrink film 9 is subjected to a heating process, thereby the film shrinks to take a profile shown by solid lines, and further pressing inward the stopper members 7. This arrangement further reinforces the packaging, and protects the contents against moisture or the like. Correspondingly, the magnetic tapes 3 are stably positioned, the tapes are protected against physical impact or the like, and the damage to the magnetic tapes is prevented. Furthermore, the pancakes (independent rolled magnetic tapes) 2 are not directly in contact with each other, and the tapes are free from damage possibly caused by mutual friction.

The core member 6 can be made of vinyl chloride resin, paper or the like. The shrink film 9 can be made of various resins such as polypropylene, and polyethylene. The bands 23 can be formed with various resins such as polypropylene.

What should be noted with the above-mentioned pancake packaging structure is that stopper members 7 at both ends are, in accordance with the present invention, made of foamed polypropylene. This advantage is hereunder described based on the preparation of the packaging structure above.

First, as indicated in FIG. 40, the core members 6 are inserted into the pancakes 3, and the stopper members 7 are respectively engaged with both end core members 6. Next, the binding bands 23 are engaged with the corresponding recesses 11 on the stopper members 7, thereby the stopper members and the core members 6 are securely connected with each other. As a result, the stopper members 7 do not come apart from the core members, and the packaging structure can be transferred to the following shrink process.

Figure 44:
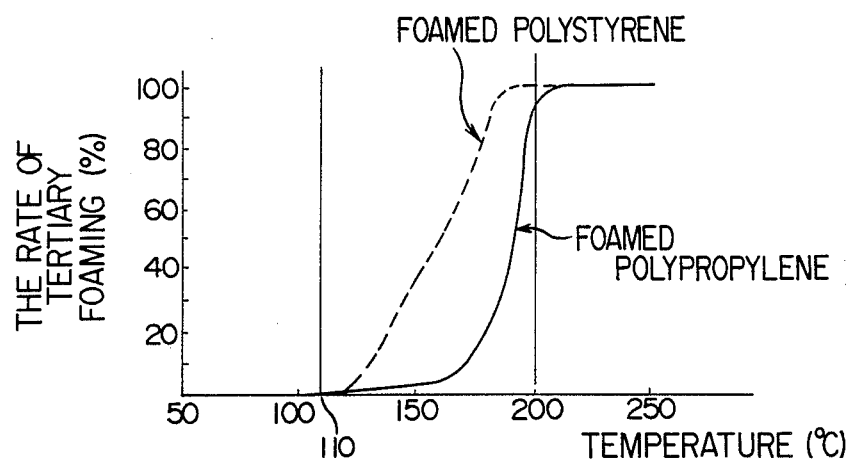
Figure 45:
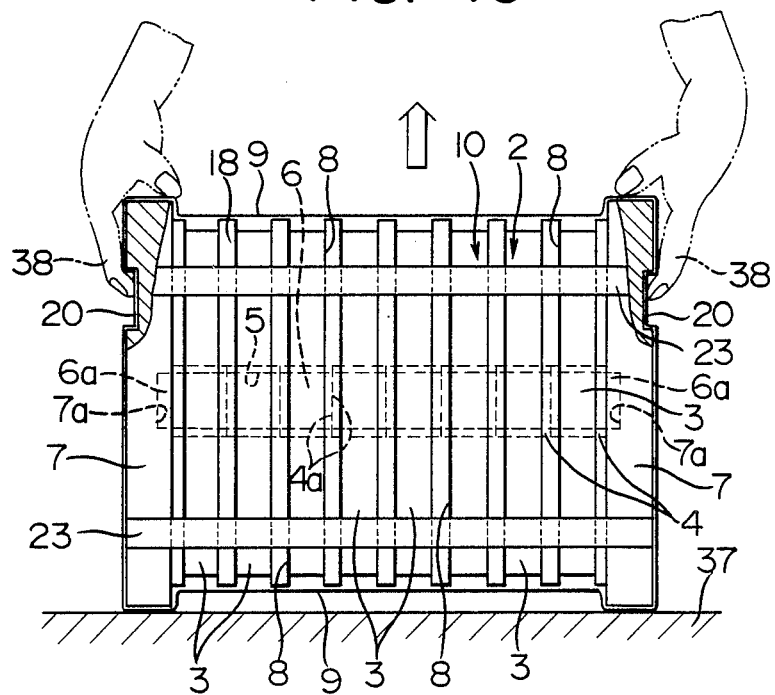

In the shrink process, the entire packaging structure is heated to 110° to 180° C., preferably to 140° to 160° C., thereby the film 9 shrinks to complete the final packaging structure. Being made of foamed polypropylene, these stopper members 7 above are capable of being resistant to the temperature (110° to 180° C., in the heat shrink process) as indicated in FIG. 44, and whose tertiary foaming rate is significantly smaller than that of foamed polystyrene. This is attributable to the foamed polypropylene particles that are sufficiently resistant to heat, and do not form further foams by heat for shrinking.

According to the above-mentioned structure, foamed polypropylene constituting the stopper members 7 has good mechanical strength, while being appropriately flexible and resilient, and, accordingly, when the bands 23 are installed, the bands 23 can be tightly attached to the stopper members 7 while the stopper members 7 are free from crack or the like.

The above-mentioned pancake packaging structure is so simply constituted that a manufacturing process for each component such as a stopper member is simple, enabling cost reduction; the packaging procedure is simple; handling for transportation or storage is simple; and this simple structure is light weight and has good transportability.

Using the bands 23, the stopper members 7—7 are bound together, and packaging is satisfactorily reinforced with the shrink film 9, thereby the final packaging structure is positively stable.

A ring shaped groove 13 disposed on the upper face or bottom face of the stopper member 7 allows, as shown by dashed lines in FIG. 6, the packaging structure to be readily held at both ends with fingers 38 or hand; the fingers 38 readily grip the grooves 13. This advantage is also valid even after binding with the bands 23 shown in FIG. 40.

The invention has been thus exemplified above. However, this embodiment can be further modified based on the technical concept of the invention.

For example, the stopper members 7 can be, instead of foamed polypropylene, made of foamed polyethylene, and can provide the advantages above. The material of the stopper members 7 can be a mixture of foamed polypropylene and foamed polyethylene. Futhermore, the material can be a mixture comprising foamed polypropylene, foamed polyethylene, and foamed polystyrene.

Figure 46:
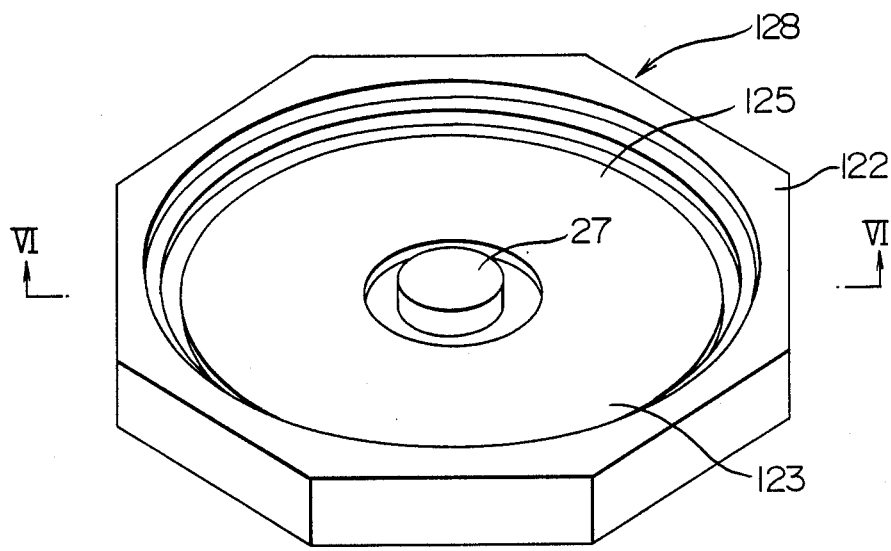
FIG. 46 is a perspective sideview of a conventional tray for transporting a pancake.
Figure 47:
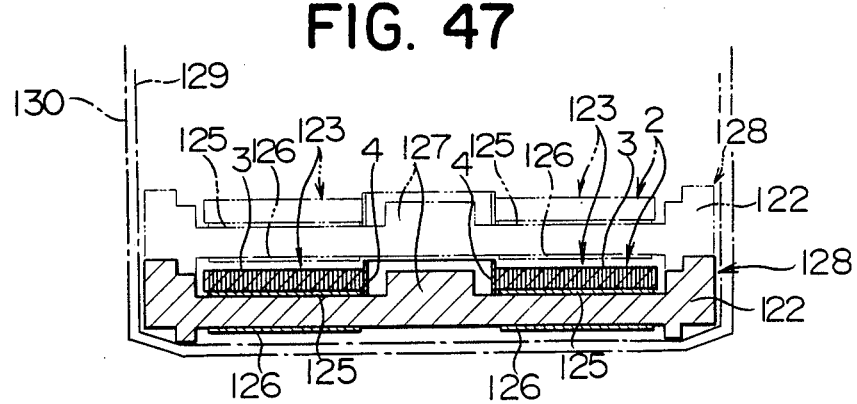
FIG. 47 is a cross-section taken on the line VI—VI in FIG. 46.

These materials can be also applicable to the trays in FIGS. 46 and 48. In this case, also, the trays 22 exhibit sufficient heat resistance when the shrink film 30 is heat-shrunk form fitting onto the packaging structure after the bands 12 have been attached; additionally, the trays 22 are less prone to tertiary foaming. Such trays have good strength and flexibility, and, also, readily receive the bands attached.

The packaging structure for ring shaped articles according to the present invention comprises core members that penetrate through the central hole on an array of ring shaped articles arranged thereon along a specific direction with the main faces of the plurality of articles being adjacent with each other; stopper members that combinedly press both end faces of the array of ring shaped articles toward their counterparts along the above-mentioned specific direction; and securing means that positively maintains the relative position among the core member and the stopper members. Accordingly, the packaging structure allows a multitude of ring shaped articles to be packaged into one entity, and is so simply constituted that a manufacturing process is simpler, thereby significant cost reduction is attained. The packaging structure is light weight, and suitable for transportation; packaging and opening procedure accompanying transportation, storage or the like is simple, allowing easy handling, while sufficiently strong packaging structure enables excellent transportability.

When using not only cushions are sandwiched between the main faces of a plurality of ring shaped articles but also a shrink packaging film that covers the overall surface of the packaging structure including the external surface of a protective sheet eliminates slack especially on the circumferential faces of the ring shaped articles, further positively positioning the articles and protecting them against damage, while the shrink packaging film presses together the stopper members and the protective sheet. Furthermore, the positioning above is performed while the cushions being sandwiched between the main faces of the ring shaped articles, and, accordingly, the damage cause by possible mutual contact of the ring shaped articles can be prevented. The shrink packaging film presses together the stopper members and the protective sheet, and covers the oaverall surface of the packaging structure including the external surface of the protective sheet, and, accordingly, the sheet can, together with the stopper member and the securing means, further reinforces the packaging structure and prevent damage from moisture or the like.

Additionally, at least circumferential faces of the array of ring shaped articles are covered with the protective sheet, and the overall surface including the external surface of the protective sheet is covered with a shrink packaging film, thereby while the above-mentioned advantage of the shrink packaging film being retained, the circumferential faces of the array of ring shaped articles are protected against adhesion with the shrink packaging film. Thus, the quality of the ring shaped articles is satisfactorily maintained.

Alternatively, when the packaging structure comprises not only first stopper members but also securing means that maintains relative position between the first stopper members and the core members, a multitude of ring shaped articles are packaged into one entity, resulting in a simple structure, and, accordingly, the packaging procedure is simple, and handling for transportation and storage is simple, and its light weight is suitable for transportation. Additionally, manufacturing each component such as a stopper member is a simple process, thereby cost reduction is attained. In essence, together with the already mentioned advantages, the packaging structure enables cost reduction in transportation and storage.

The packaging structure also comprises a pair of second stopper members that press inward the first stopper members from both ends along the previously mentioned specific direction, as well as fixing means that connects together the second stopper members and maintains the relative positions of the same members, wherein the second stopper members positively maintain the shape of the packaging structure, whereby the packaging structure is stably protected against outside impact or the like. Accordingly, together with the shock-absorbing operation of the first and second stopper members, the articles are protected against impact or the like, hence improved transportability.

Furthermore, a projection formed in the center of a stopper member or an unloaded core member possibly prevents the stopper member, that is deformed when secured with the above-mentioned securing means, from coming into contact with the ring shaped articles. Accordingly, the articles are not damaged by contract with the stoppers, thereby the packaging structure is completed with good reliability.

By preventing the stopper member, that is deformed when secured with the above-mentioned securing means, from coming into contact with the ring shaped articles, the articles are positively prevented against damage by contact with other objects, hence more reliable packaging.

Forming at least a portion of cushion member with foamed polypropylene and/or foamed polyethylne makes the member more heat resistant, and less prone to heat deformation of heat degradation contributable to tertiary foaming, and, at the same time, such a cushion member has appropriate strength and resilience, thereby it allows secure fixing with securing means, resulting in a strong packaging structure.

What is claimed is:

1. An apparatus packaging a plurality of rolls of tape wound around angular stacked flangeless hubs, said apparatus comprising:
   a core means passing through said stacked hubs of said plurality of rolls so that said hubs and rolls are aligned in a common axial direction,
   a pair of end plate members sandwiching the stacked hubs therebetween, and
   fixing means pressing said pair of end plate members axially toward said stacked hubs to fix the position of said hubs,
   said fixing means including a shrinkable film pressing the circumferential surface of said rolls of tape.
2. The apparatus of claim 1,
   wherein said fixing means comprises a band.
3. The apparatus of claim 1,
   wherein said end plate members are deformable in the pressing direction, and
   wherein the deforming portion of said members are adapted to not to come in contact with said rolls of tape.
4. The apparatus of claim 1,
   wherein said end plate members are made of foamed polypropylene.
5. The apparatus of claim 1,
   wherein said end plate members are made of foamed polyethylene.
6. The apparatus of claim 1,
   wherein said end plate members are made of a material comprising a foamed polyethylene and a foamed polypropylene.
7. The apparatus of claim 1 wherein a cushion means is provided between said rolls of tape.
8. The apparatus of claim 1 wherein each of said end plate members is provided with protrusions adapted to contact said hubs.
9. The apparatus of claim 1 wherein between the rolls of tape positioned closest to said end plate members and said end plate members, there are provided additional hubs having no roll of tape attached thereto.
10. The apparatus of claim 1 wherein each of said end plate members is provided with a hole into which said core means is inserted, the length of said core means (L), the height of said stacked plurality of rolls (A), and the depth of said holes (B) satisfying the following relation:

$$A < L < A + B.$$

* * * * *